(12) United States Patent
Inoue et al.

(10) Patent No.: US 9,983,392 B2
(45) Date of Patent: May 29, 2018

(54) PROJECTION ZOOM LENS AND IMAGE PROJECTION APPARATUS

(71) Applicant: KONICA MINOLTA, INC., Chiyoda-ku (JP)

(72) Inventors: Kazuhiko Inoue, Kita-ku (JP); Yusuke Imai, Osaka (JP)

(73) Assignee: KONICA MINOLTA, INC., Tokyo (JP)

(*) Notice: Subject to any disclaimer, the term of this patent is extended or adjusted under 35 U.S.C. 154(b) by 0 days. days.

(21) Appl. No.: 15/450,834

(22) Filed: Mar. 6, 2017

(65) Prior Publication Data

US 2017/0276916 A1    Sep. 28, 2017

(30) Foreign Application Priority Data

Mar. 24, 2016  (JP) .................. 2016-059913

(51) Int. Cl.
| | | |
|---|---|---|
| G02B 15/14 | (2006.01) | |
| G02B 15/177 | (2006.01) | |
| G02B 13/04 | (2006.01) | |
| G02B 13/16 | (2006.01) | |
| G02B 27/00 | (2006.01) | |
| G03B 21/14 | (2006.01) | |

(52) U.S. Cl.
CPC .......... *G02B 15/177* (2013.01); *G02B 13/04* (2013.01); *G02B 13/16* (2013.01); *G02B 27/0025* (2013.01); *G03B 21/142* (2013.01)

(58) Field of Classification Search
CPC ...... G02B 15/177; G02B 13/04; G02B 13/16; G02B 27/0025; G03B 21/142
USPC .................................................... 359/680
See application file for complete search history.

(56) References Cited

FOREIGN PATENT DOCUMENTS

JP    2008-052174    3/2008

*Primary Examiner* — Jack Dinh
(74) *Attorney, Agent, or Firm* — Cozen O'Connor

(57) ABSTRACT

A projection zoom lens includes, sequentially from an enlargement conjugate side: a first lens group having negative refractive power; a second lens group having positive or negative refractive power; a third lens group having positive refractive power; a fourth lens group having negative refractive power; a fifth lens group having positive refractive power; and a sixth lens group having positive refractive power, and configured to perform a magnification variation by changing the interval between the respective lens groups, wherein the fourth lens group includes at least one positive lens and at least one negative lens, at least one of the positive lenses included in the fourth lens group satisfies the following Conditional Expressions: $0.71 \leq \theta g\_Fp + 0.004 \times vdp \leq 0.73$ and $15 \leq vdp \leq 25$, and the back focus of the entire projection zoom lenses satisfies the following Conditional Expression $1.0 \leq BF/Fw \leq 2.7$.

8 Claims, 17 Drawing Sheets

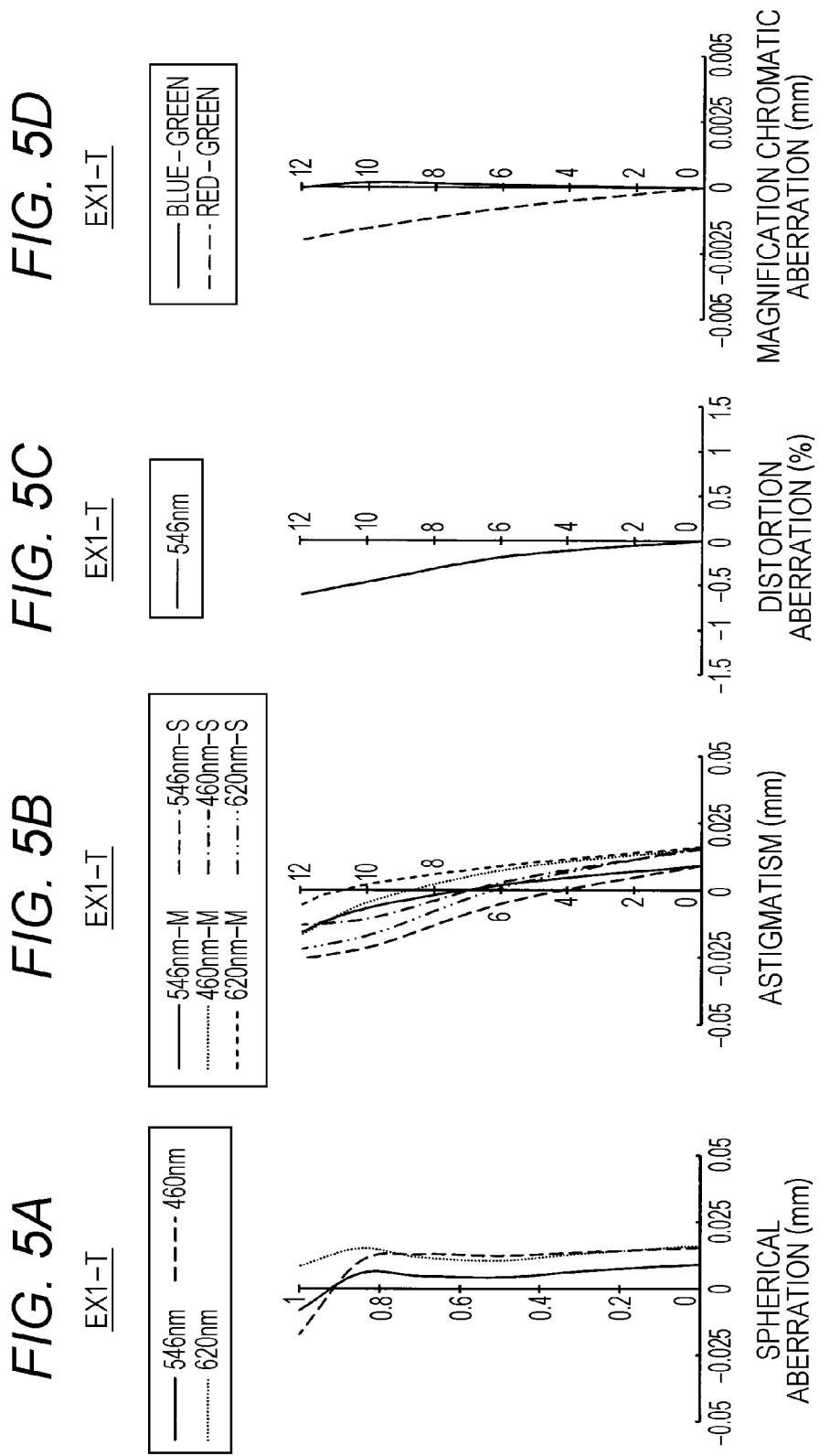

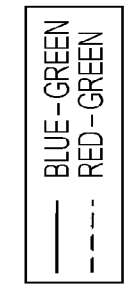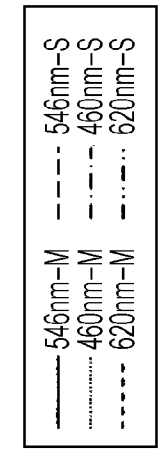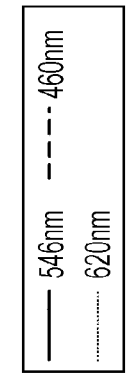
FIG. 7A  FIG. 7B  FIG. 7C  FIG. 7D

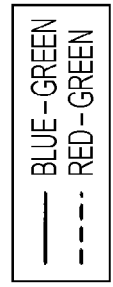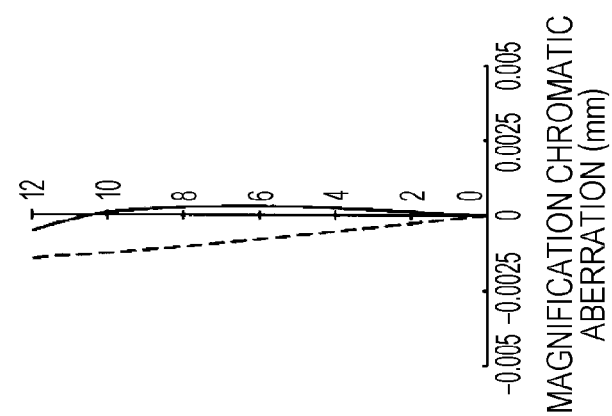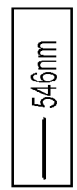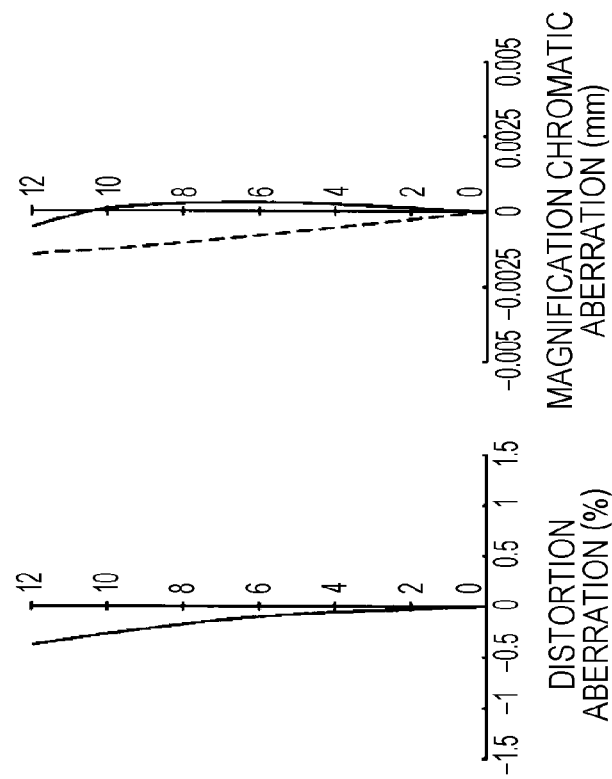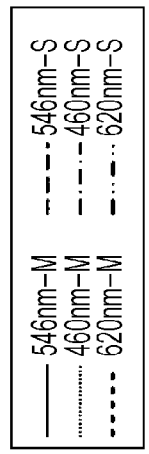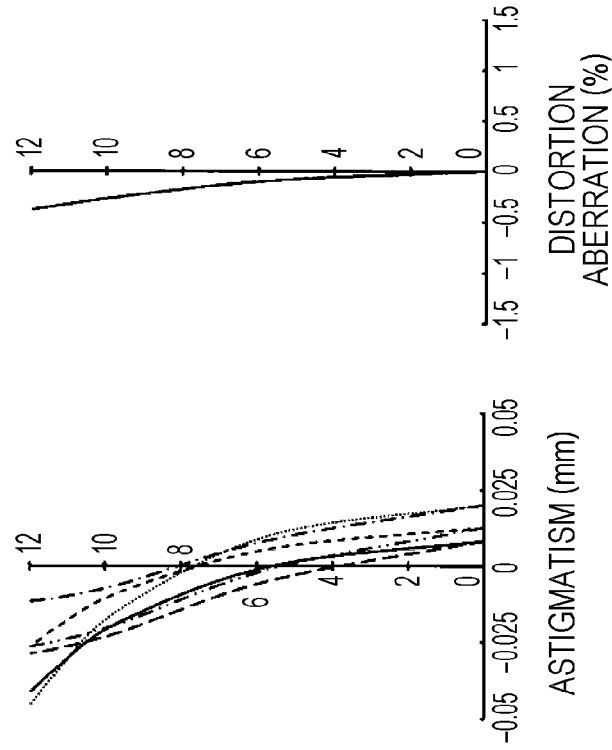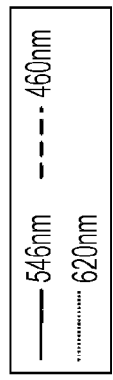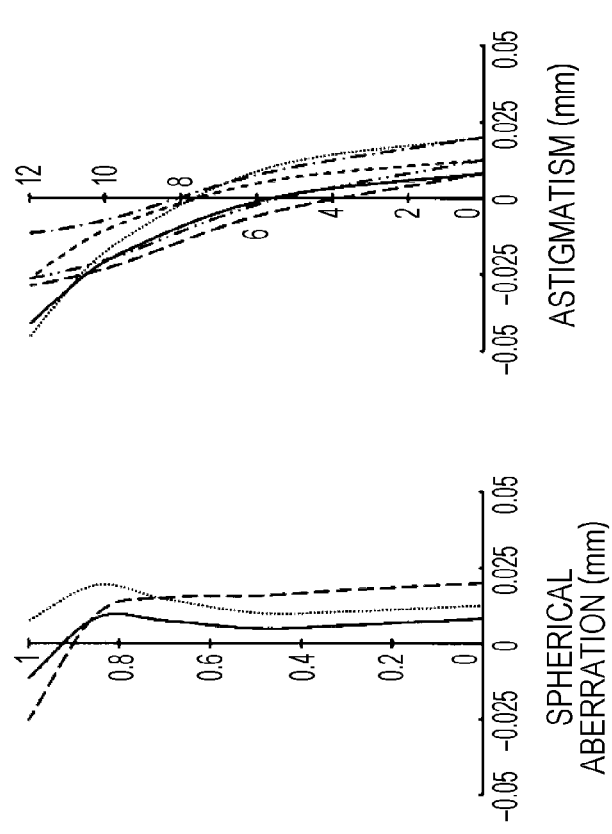
FIG. 8A EX2-T
FIG. 8B EX2-T
FIG. 8C EX2-T
FIG. 8D EX2-T

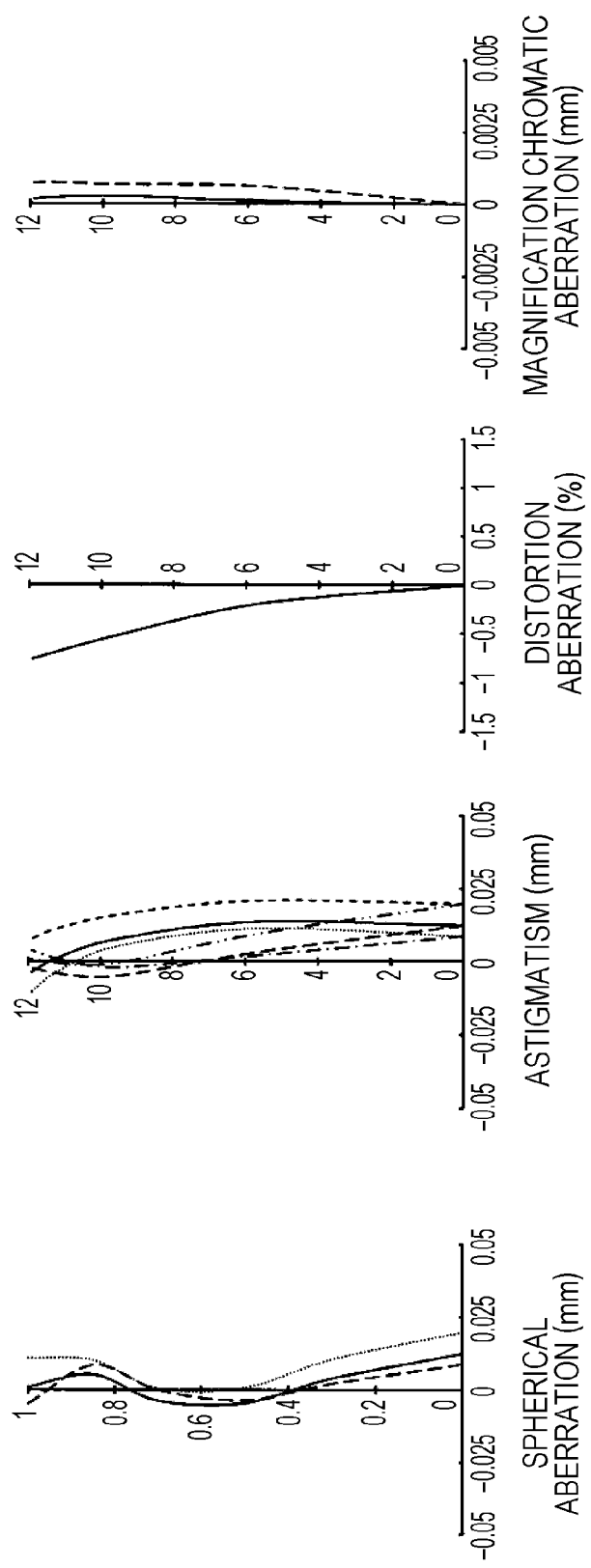

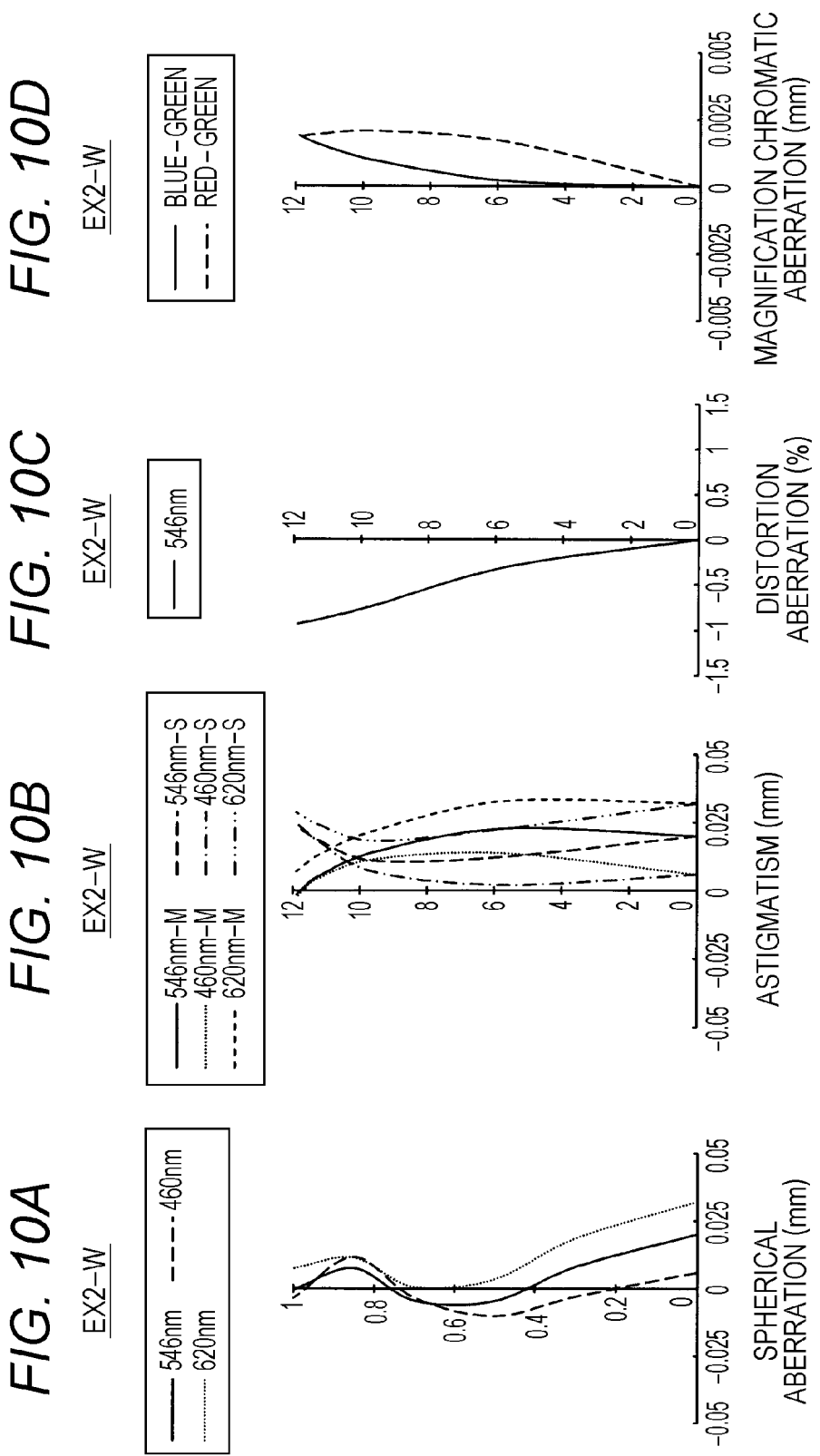

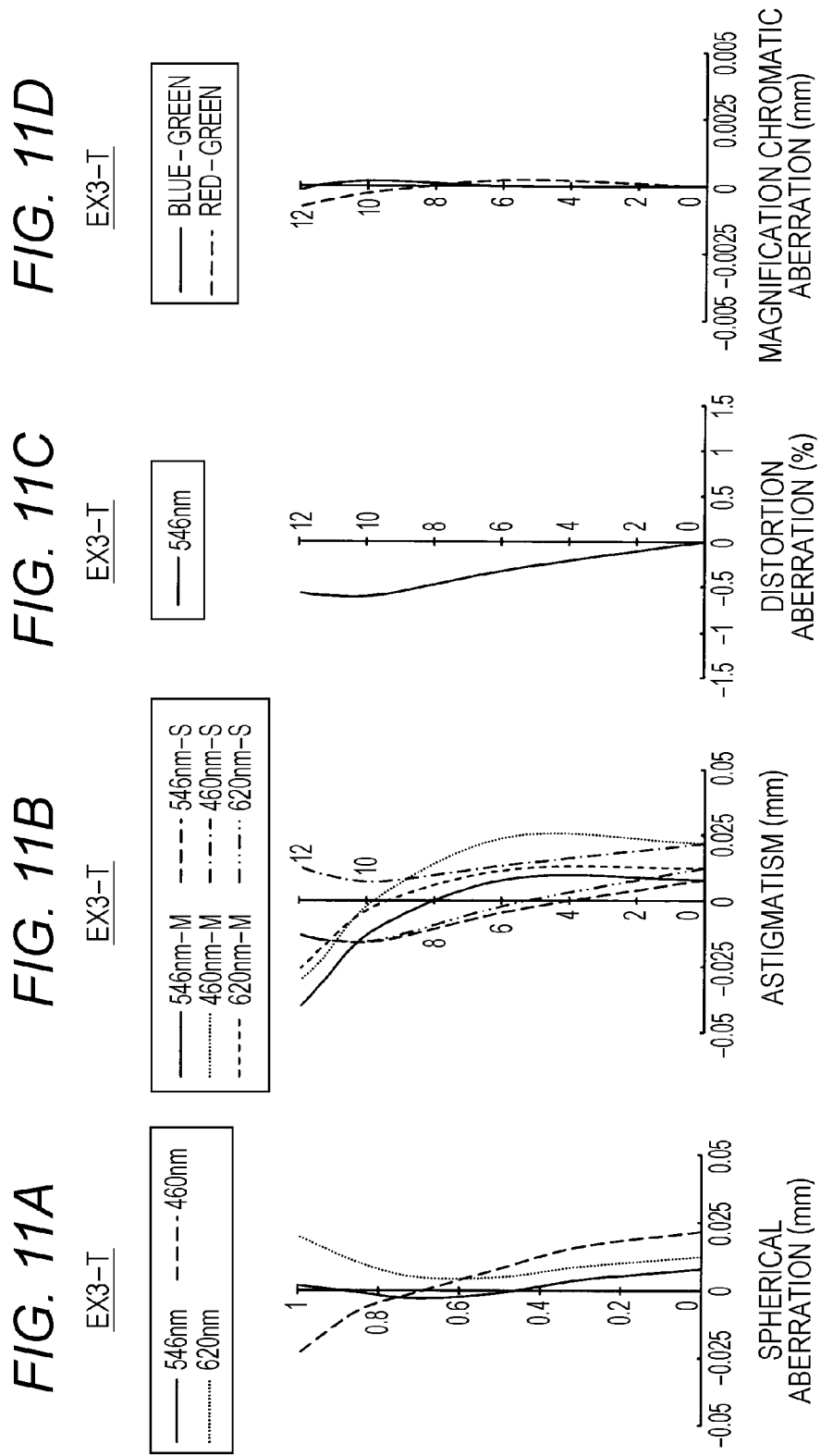

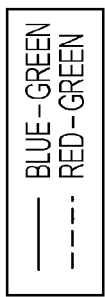 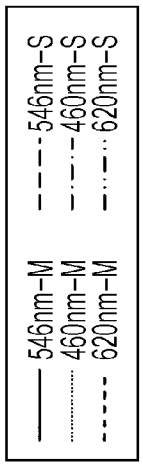 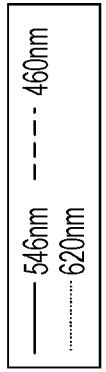 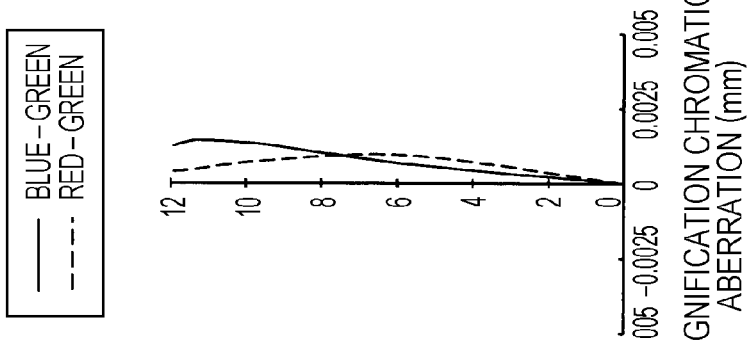
FIG. 12A EX3-M
FIG. 12B EX3-M
FIG. 12C EX3-M
FIG. 12D EX3-M

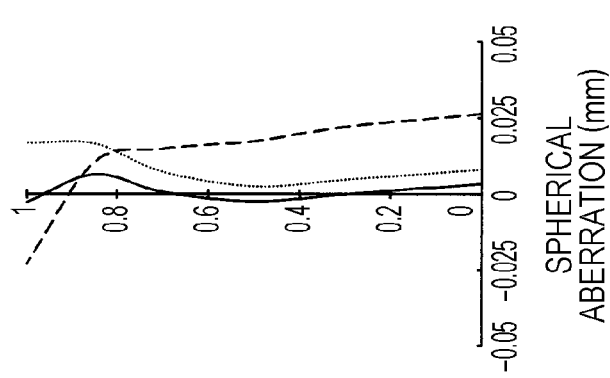
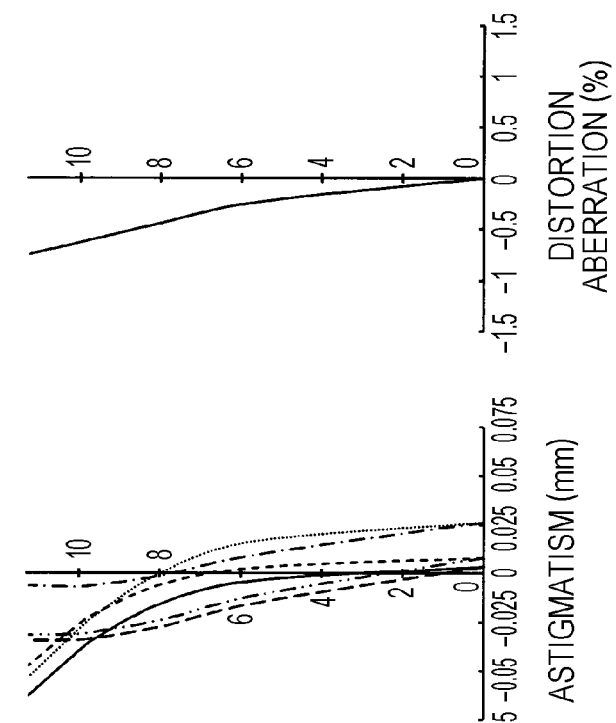
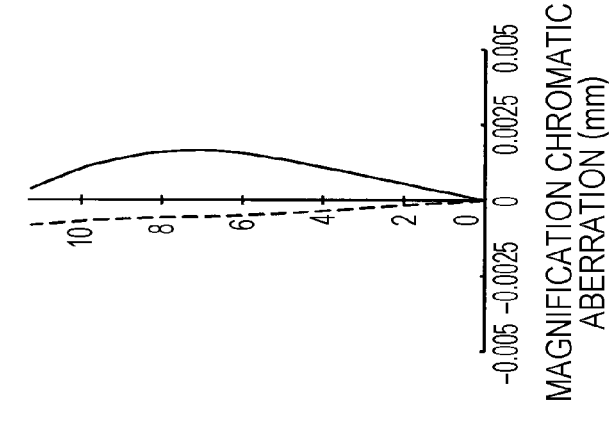
FIG. 14A EX4-T
FIG. 14B EX4-T
FIG. 14C EX4-T
FIG. 14D EX4-T

EX4-M

EX4-M

EX4-M

EX4-M

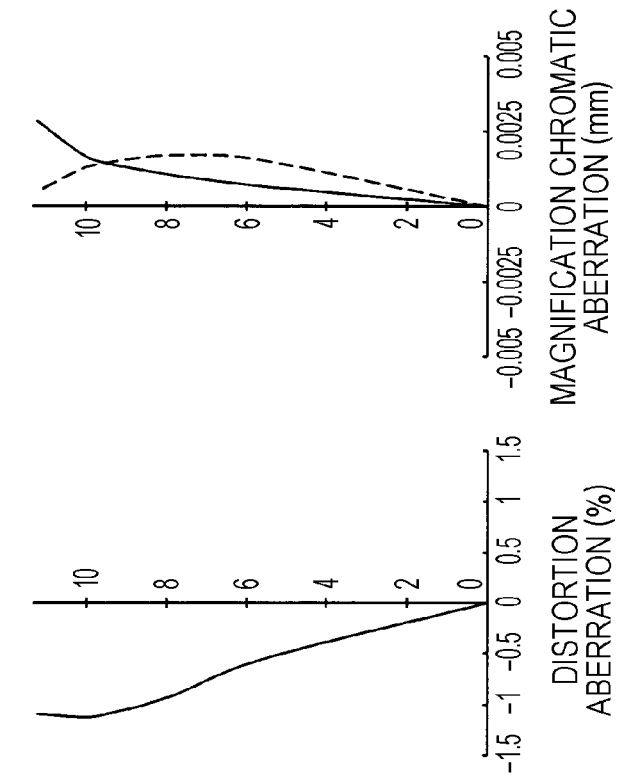

PROJECTION ZOOM LENS AND IMAGE PROJECTION APPARATUS

The entire disclosure of Japanese Patent Application No. 2016-059913 filed on Mar. 24, 2016 including description, claims, drawings, and abstract are incorporated herein by reference in its entirety.

BACKGROUND OF THE INVENTION

Field of the Invention

The present invention relates to a projection zoom lens and an image projection apparatus, and more particularly, to a projection zoom lens which is suitable for enlarging and projecting a display image of an image display element such as a digital micromirror device or a liquid crystal display (LCD) onto a screen, and an image projection apparatus including the same.

Description of the Related Art

In a three-panel type projector, an axial chromatic aberration can be suppressed by adjusting the position of the image display element. In contrast, in a single-panel type projector, because the position of the image display element is defined, it is necessary to correct the axial chromatic aberration in the projection zoom lens. In addition, with regard to aberrations other than axial chromatic aberration, it is required to satisfactorily correct aberrations with miniaturization of the image display element. Therefore, in order to achieve a high performance, a projection zoom lens using a glass material with a high refractive index for a positive lens in the vicinity of an aperture is disclosed in JP 2008-52174 A.

However, in the projection zoom lens described in JP 2008-52174 A, it is difficult to cope with the high definition of the image display element mounted on the recent image projection apparatus. That is, since the required performance of the axial chromatic aberration becomes higher, it is difficult to achieve a sufficient axial chromatic aberration correction in the technique described in JP 2008-52174 A.

SUMMARY OF THE INVENTION

The present invention has been made in view of such a situation, and an object thereof is to provide a projection zoom lens having a high axial chromatic aberration capability capable of coping with a high-definition image display element, and an image projection apparatus including the same.

To achieve the abovementioned object, according to an aspect, a projection zoom lens reflecting one aspect of the present invention comprises, sequentially from an enlargement conjugate side: a first lens group having negative refractive power; a second lens group having positive or negative refractive power; a third lens group having positive refractive power; a fourth lens group having negative refractive power; a fifth lens group having positive refractive power; and a sixth lens group having positive refractive power, and configured to perform a magnification variation by changing the interval between the respective lens groups, wherein the fourth lens group comprises at least one positive lens and at least one negative lens, at least one of the positive lenses included in the fourth lens group satisfies the following Conditional Expressions (1) and (2), and the back focus of the entire projection zoom lenses satisfies the following Conditional Expression (3):

$$0.71 \le \theta g\_Fp + 0.004 \times vdp \le 0.73 \quad (1)$$

$$15 \le vdp \le 25 \quad (2)$$

$$1.0 \le BF/Fw \le 2.7 \quad (3)$$

where
θg_Fp: partial dispersion ratio of lens material,
θg_Fp=(Ng−NF)/(NF−NC)
Ng: refractive index of g line,
NF: refractive index of F line,
NC: refractive index of C line,
vdp: Abbe number of the lens material,
BF: air conversion back focus from the last lens surface to the image surface, and
Fw: focal length of the entire projection zoom lenses at the wide-angle end.

According to the projection zoom lens of Item. 2, in the invention of Item. 1, an aperture stop is preferably disposed between a surface of the third lens group closest to a reduction conjugate side and a surface of the fifth lens group closest to an enlargement conjugate side.

According to the projection zoom lens of Item. 3, in the invention of Item. 1 or 2, the fourth lens group preferably comprises two negative lenses and one positive lens sequentially from the enlargement conjugate side.

According to the projection zoom lens of Item. 4, in the invention of Item. 1 or 2, the fourth lens group preferably comprises one negative lens and one positive lens sequentially from the enlargement conjugate side.

According to the projection zoom lens of Item. 5, in the invention of any one of Items. 1 to 4, the positive lens, which satisfies Conditional Expressions (1) and (2), preferably satisfies the following Conditional Expression (4):

$$0.85 \le |\Phi p/\Phi 4| \le 1.45 \quad (4)$$

where
Φp: refractive power of a positive lens, and
Φ4: refractive power of the fourth lens group.

According to the projection zoom lens of Item. 6, in the invention of any one of Items. 1 to 5, the following Conditional Expression (5) is preferably satisfied:

$$0.18 \le |\Phi 4/\Phi w| \le 0.24 \quad (5)$$

where
Φ4: refractive power of the fourth lens group, and
Φw: refractive power of the entire projection zoom lens at the wide-angle end.

According to the projection zoom lens of Item. 7, in the invention of any one of Items. 1 to 6, at least one of the negative lenses included in the fourth lens group preferably satisfies the following Conditional Expressions (6) and (7):

$$0.645 \le \theta g\_Fn + 0.001682 \times vdn \le 0.695 \quad (6)$$

$$60 \le vdn \le 100 \quad (7)$$

where
θg_Fn: partial dispersion ratio of the lens material,
θg_Fn=(Ng−NF)/(NF−NC)
Ng: refractive index of g line,
NF: refractive index of F line,
NC: refractive index of C line, and
vdn: Abbe number of the lens material.

To achieve the abovementioned object, according to an aspect, an image projection apparatus reflecting one aspect of the present invention comprises: an image forming element configured to form an image light; and the projection zoom lens of any one of Items. 1 to 7 configured to enlarge and project the image light.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 5A to 5D are aberration diagrams at a telephoto end in Example 1;

FIGS. 7A to 7D are aberration diagrams at a wide-angle end of Example 1;

FIGS. 8A to 8D are aberration diagrams at a telephoto end in Example 2;

FIGS. 9A to 9D are aberration diagrams at an intermediate position of Example 2;

FIGS. 10A to 10D are aberration diagrams at a wide-angle end of Example 2;

FIGS. 11A to 11D are aberration diagrams at a telephoto end of Example 3;

FIGS. 12A to 12D are aberration diagrams at an intermediate position of Example 3;

FIGS. 14A to 14D are aberration diagrams at a telephoto end in Example 4;

FIGS. 16A to 16D are aberration diagrams at a wide-angle end of Example 4; and

DESCRIPTION OF THE PREFERRED EMBODIMENTS

Figure 1:
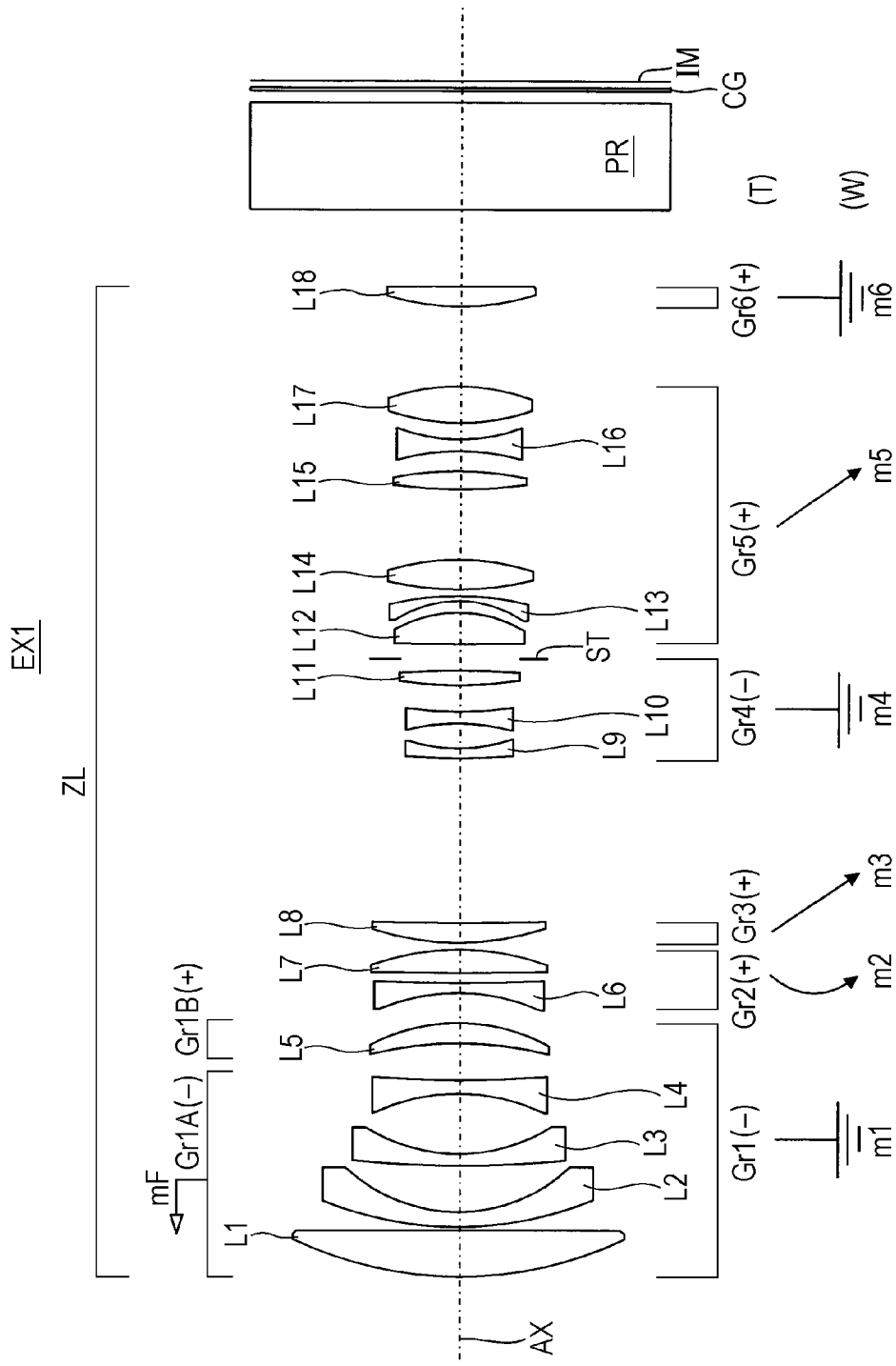
FIG. 1 is a lens configuration diagram of a first embodiment (Example 1)
Figure 2:
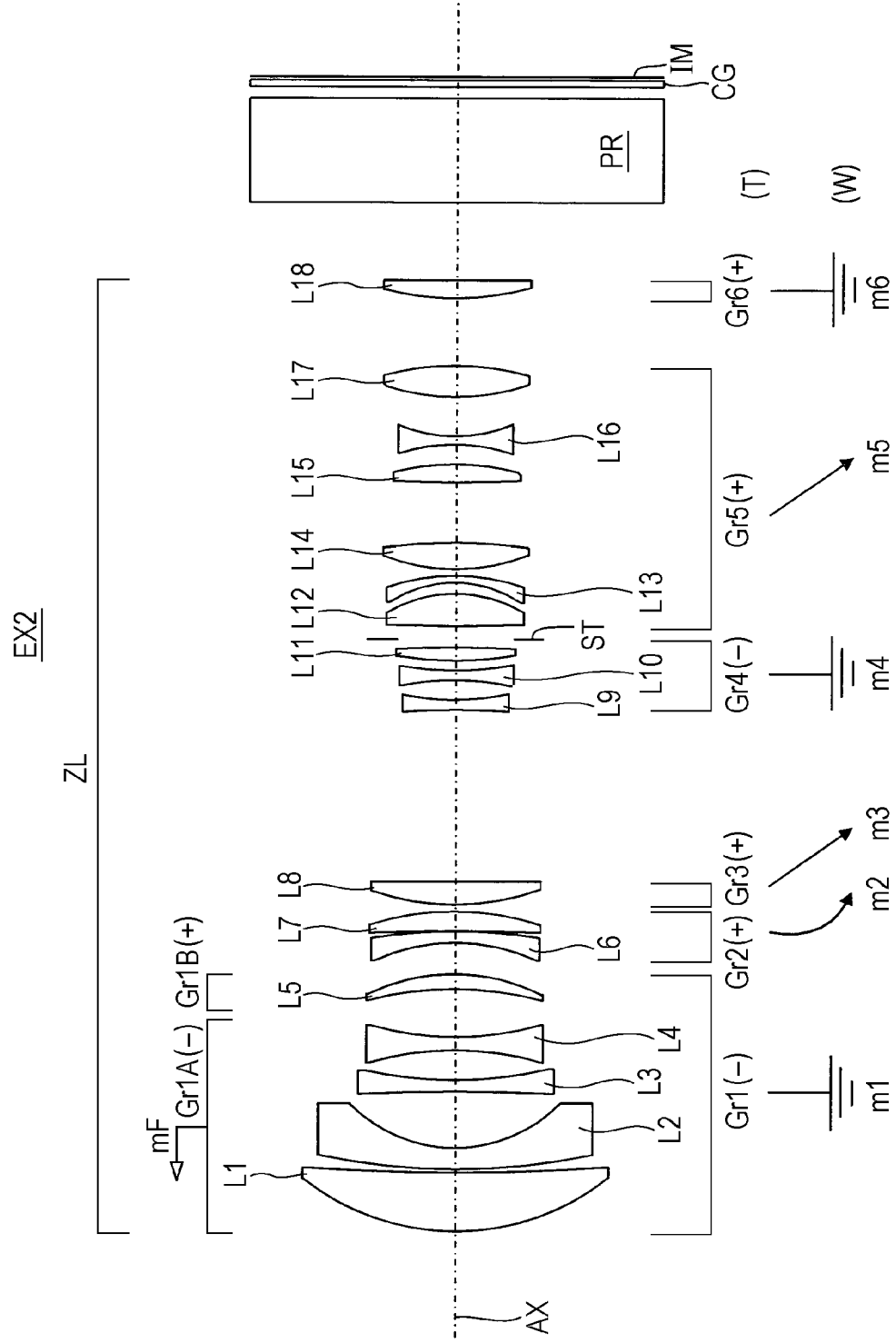
FIG. 2 is a lens configuration diagram of a second embodiment (Example 2)
Figure 3:
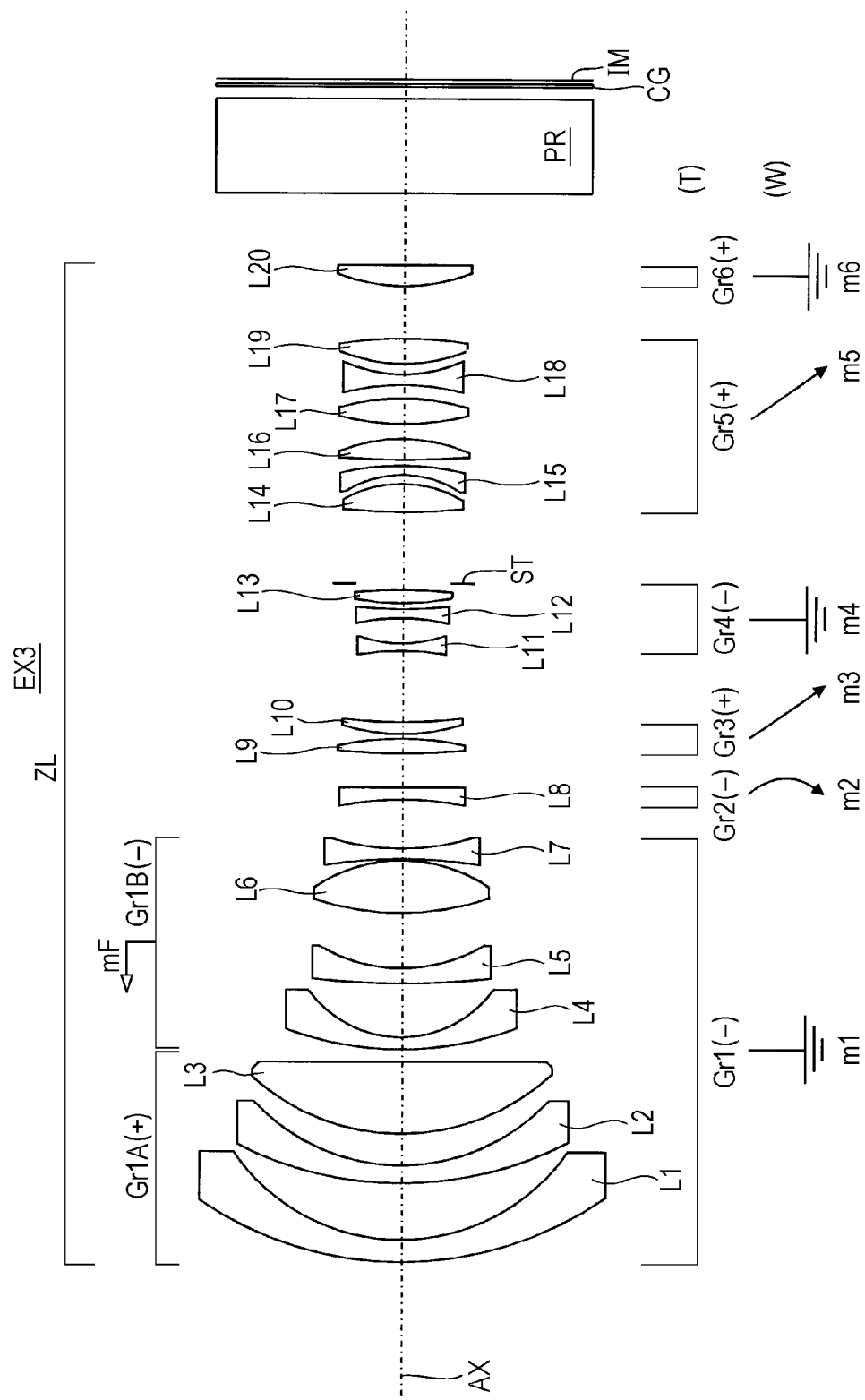
FIG. 3 is a lens configuration diagram of a third embodiment (Example 3)
Figure 4:
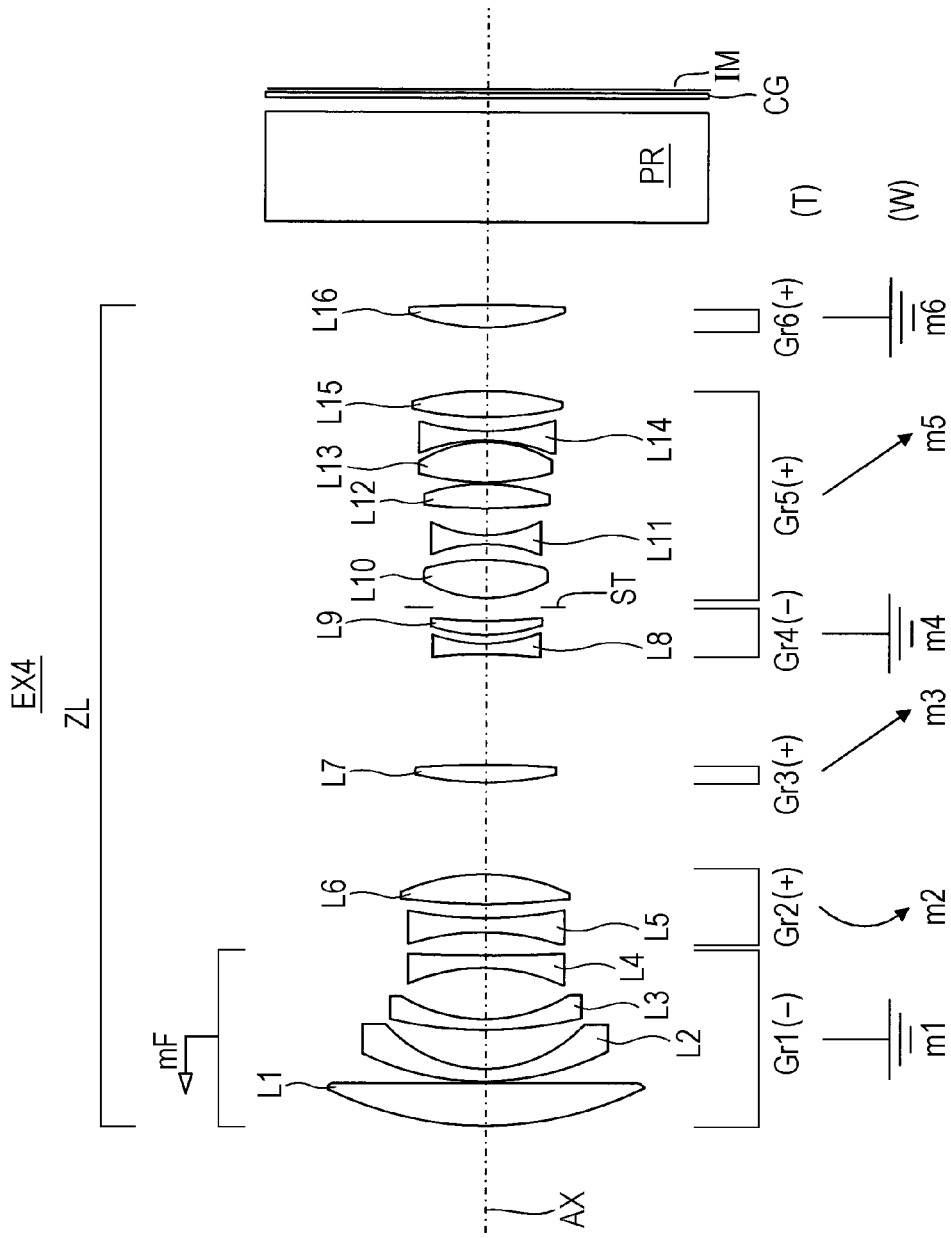
FIG. 4 is a lens configuration diagram of a fourth embodiment (Example 4)
Figure 6A:
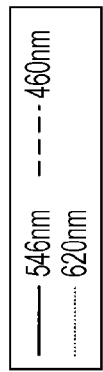
FIGS. 6A to 6D are aberration diagrams at an intermediate position of Example 1.
Figure 6B:
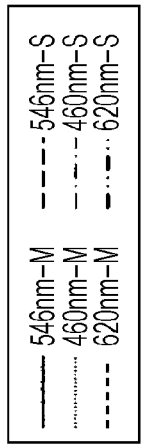
Figure 6C:
Figure 6D:
Figure 13A:
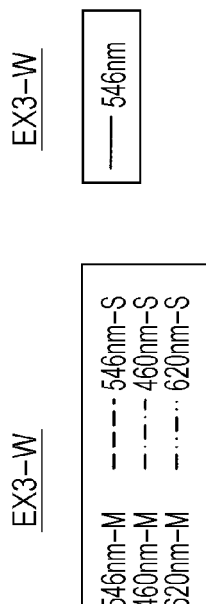
FIGS. 13A to 13D are aberration diagrams at a wide-angle end of Example 3.
Figure 13B:
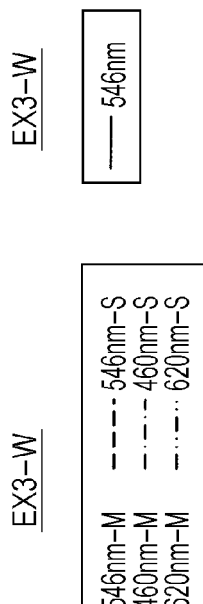
Figure 13C:
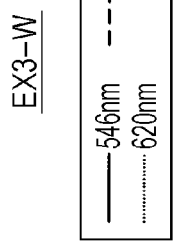
Figure 13D:
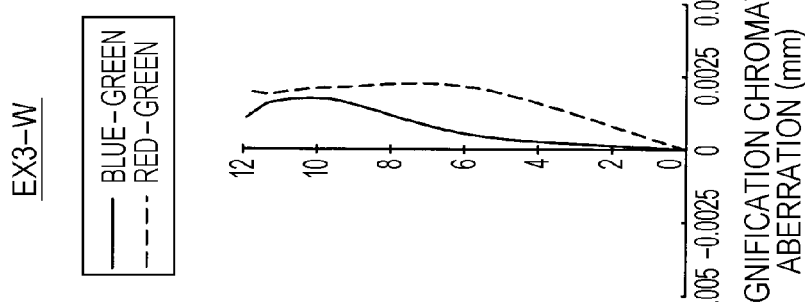
Figure 15A:
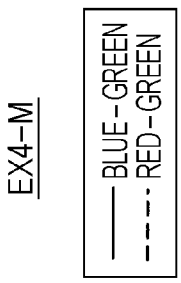
FIGS. 15A to 15D are aberration diagrams at an intermediate position of Example 4.
Figure 15B:
Figure 15C:
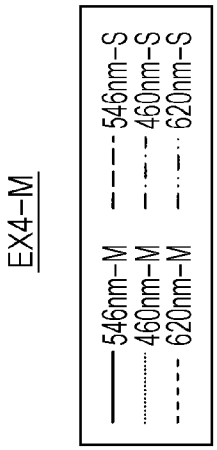
Figure 15D:
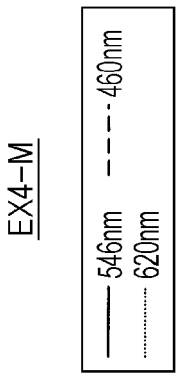

Hereinafter, a projection zoom lens, an image projection apparatus and the like according to an embodiment of the present invention will be described with reference to the drawings. However, the scope of the invention is not limited to the illustrated examples. The projection zoom lens according to the embodiment of the present invention includes, sequentially from an enlargement conjugate side, a first lens group having negative refractive power, a second lens group having positive or negative refractive power, a third lens group having positive refractive power, a fourth lens group having negative refractive power, a fifth lens group having positive refractive power, and a sixth lens group having positive refractive power, and is configured to perform magnification variation by changing the interval between the respective lens groups (Refractive power: corresponding to the reciprocal of the focal length). Further, although the expression such as "enlargement conjugate side" or "reduction conjugate side" is used as the direction of the projection zoom lens, but the "enlargement conjugate side" is a direction in which the optical image is enlarged and projected onto a screen or the like, and its opposite direction is the "reduction conjugate side", that is, a direction in which the image display element (for example, a digital micromirror device) for displaying the original optical image is disposed. Therefore, in the projection zoom lens, a lens surface closest to the reduction conjugate side is a final surface of the lens, and a lens surface closest to the enlargement conjugate side is a foremost surface of the lens.

Further, in the projection zoom lens, the fourth lens group includes at least one positive lens and at least one negative lens. At least one of the positive lenses included in the fourth lens group satisfies the following Conditional Expressions (1) and (2), and a back focus of the entire projection zoom lenses satisfies the following Conditional Expression (3):

$$0.71 \leq \theta g\_Fp + 0.004 \times vdp \leq 0.73 \quad (1)$$

$$15 \leq vdp \leq 25 \quad (2)$$

$$1.0 \leq BF/Fw \leq 2.7 \quad (3)$$

where $\theta g\_Fp$: partial dispersion ratio of the lens material,
$\theta g\_Fp = (Ng-NF)/(NF-NC)$
Ng: refractive index of g line,
NF: refractive index of F line,
NC: refractive index of C line,
vdp: Abbe number of the lens material,
BF: air conversion back focus from the last lens surface to the image surface, and
Fw: focal length of the entire projection zoom lenses at the wide-angle end.

For example, when configuring a single-panel type projector, the back focus of the entire projection zoom lenses needs to satisfy the value of the extent that is set in Conditional Expression (3). Further, in the six-unit zoom configuration of the negative, positive, positive, negative, positive and positive lenses or negative, negative, positive, negative, positive and positive lenses, as long as one or more positive lenses are disposed in the fourth lens group, and a glass material having anomalous dispersibility as defined in Conditional Expression (1) and Conditional Expression (2) is used as the positive lens, since the positive lens acts in the vicinity of the aperture stop, it is possible to satisfactorily correct the axial chromatic aberration.

When using a glass material that falls below the lower limit of Conditional Expression (1) or exceeds the upper limit of Conditional Expression (2), the axial chromatic aberration of the short wavelength side easily comes out in an over-direction, and the axial chromatic aberration of the long wavelength side easily comes out in an under-direction. Accordingly, there is a need to increase the curvature of the positive lens in order to obtain the same effect, and various aberrations other than axial chromatic aberration, particularly, a spherical aberration, are deteriorated. Since there are few types of glass materials exceeding the upper limit of Conditional Expression (1) or falling below the lower limit of Conditional Expression (2), there are many glass materials which are hard to process or have low transmittance, and the glass materials are not suitable for the projection optical system.

The upper limit of Conditional Expression (3) represents a projection zoom lens of a one-chip type (a single panel type) having a short back focus. Therefore, when exceeding the upper limit of Conditional Expression (3), a projection zoom lens which is not suitable for the one-chip type is obtained. Further, when falling below the lower limit of Conditional Expression (3), the angle tends to be widened, the refractive power of the fourth lens group becomes too strong, and the spherical aberration tends to occur on the negative side.

According to the aforementioned characteristic configuration, because a configuration in which the positive lens with the appropriately set material and the like is used in the fourth lens group having the negative refractive power is provided, it is possible to achieve a projection zoom lens having a high axial chromatic aberration performance capable of coping with the high-definition image display element. As long as the projection zoom lens is used in the image projection apparatus, it is possible to contribute to an enhancement of the performance of the image projection apparatus, an enhancement of function, compactness, and the like. Conditions for achieving such effects in a well-balanced manner and for achieving higher optical performance, miniaturization and the like will be described below.

It is desirable that an aperture stop be disposed between the surface of the third lens group closest to the reduction conjugate side and the surface of the fifth lens group closest to the enlargement conjugate side. That is, the aperture stop is preferably located to be adjacent to the enlargement conjugate side (a front side) of the fourth lens group, is located in the fourth lens group, or is located to be adjacent to the reduction conjugate side (a rear side) of the fourth lens group. In the projection zoom lens of the negative group front type, because the luminous flux becomes narrowest in the vicinity of the aperture stop, if the fourth lens group including the positive lens is located in the vicinity of the aperture stop, an influence on the off-axial various aberrations decreases at the time of correction of the axial chromatic aberration, and the axial chromatic aberration can be efficiently corrected.

It is desirable that the fourth lens group includes two negative lenses and one positive lens sequentially from the enlargement conjugate side. Alternatively, it is desirable that the fourth lens includes one negative lens and one positive lens sequentially from the enlargement conjugate side. Many of the glass materials defined by Conditional Expressions (1) and (2) have a high refractive index, and when using them as a positive lens, the positive refractive power becomes large. Therefore, in order to form the fourth lens group having the negative refractive power as a whole, it is preferable that the positive lens includes only one lens.

It is desirable that the positive lens satisfying Conditional Expressions (1) and (2) satisfies the following Conditional Expression (4):

$$0.85 \leq |\Phi p/\Phi 4| \leq 1.45 \qquad (4)$$

where $\Phi p$: refractive power of a positive lens, and $\Phi 4$: refractive power of the fourth lens group.

In order to effectively correct the axial chromatic aberration in the fourth lens group, it is necessary to appropriately set the refractive power of the positive lens. When falling below the lower limit of Conditional Expression (4), the axial chromatic aberration of the short wavelength side easily comes out in the under-direction, and the axial chromatic aberration of the long wavelength side easily comes out in the over-direction. Accordingly, it is difficult to sufficiently obtain the correcting effect of the axial chromatic aberration in the positive lens. When exceeding the upper limit of Conditional Expression (4), the spherical aberration strongly occurs on the over side by the positive lens, and it is difficult to obtain a satisfactory optical performance in the whole optical system. Therefore, if Conditional Expression (4) is satisfied, it is possible to satisfactorily perform the correction of the axial chromatic aberration and the correction of the spherical aberration or the like.

It is desirable to satisfy the following Conditional Expression (5):

$$0.18 \leq |\Phi 4/\Phi w| \leq 0.24 \qquad (5)$$

where $\Phi 4$: refractive power of the fourth lens group, and $\Phi w$: refractive power of the entire projection zoom lens at the wide-angle end.

In order to satisfy the predetermined back focus as the whole optical system, it is necessary to appropriately set the refractive power of the fourth lens group. When falling below the lower limit of Conditional Expression (5), the back focus becomes too long, and it is necessary to increase the refractive power of the other negative lens groups. Since the negative lens groups other than the fourth lens group are disposed on the enlargement conjugate side, when increasing the refractive powers of these groups, a distortion aberration occurs in the under direction and the correction becomes difficult. When exceeding the upper limit of Conditional Expression (5), the focal length of the entire optical system becomes too short, and it is necessary to increase the refractive power of the other positive lens groups. As a result, the off-axis various aberrations increase and the correction becomes difficult. In particular, if the refractive power of the fifth lens group becomes too large, a chromatic aberration of magnification of the shorter wavelength side occurs in the under-direction, and the correction of other lens groups becomes difficult. Therefore, if Conditional Expression (5) is satisfied, it is possible to satisfactorily correct the aberration with good balance, while properly maintaining the back focus.

It is desirable that at least one of the negative lenses included in the fourth lens group satisfies the following Conditional Expressions (6) and (7):

$$0.645 \leq \theta g\_Fn + 0.001682 \times vdn \leq 0.695 \qquad (6)$$

$$60 \leq vdn \leq 100 \qquad (7)$$

where $\theta g\_Fn$: partial dispersion ratio of the lens material, $\theta g\_Fn = (Ng - NF)/(NF - NC)$ Ng: refractive index of g line, NF: refractive index of F line, NC: refractive index of C line, and vdn: Abbe number of the lens material.

In general, the glass has the property of being distributed in the vicinity of a straight line represented by $\theta g\_F = 0.645 + 0.001682 \times vd$ on the plane in which the Abbe number vd is set on the horizontal axis and the partial dispersion ratio $\theta g\_F$ is set on the vertical axis. A glass material having a partial dispersion ratio $\theta g\_F$ larger than this straight line and having the Abbe number larger than the lower limit of Conditional Expression (7) is referred to as an anomalous dispersion glass. In the fourth lens group disposed in the vicinity of the aperture stop, if an anomalous dispersion glass satisfying Conditional Expressions (6) and (7) is used for the negative lens included therein, the focal point of the short wavelength light moves to the over side, the axial chromatic aberration can be further suppressed.

When a glass material falling below the lower limit of Conditional Expressions (6) and (7) is used, the axial chromatic aberration of the short wavelength side easily comes out in the over-direction, and the axial chromatic aberration of the long wavelength side easily comes out in the under-direction. In addition, it is difficult to manufacture a lens that exceeds the upper limits of Conditional Expressions (6) and (7) with ordinary quartz glass, and it is necessary to use fluorite glass or the like. However, since the fluorite glass is vulnerable to a temperature change, the fluorite glass is not suitable for use in the vicinity of the aperture stop in which the luminous flux diameter decreases and the fluorite glass tends to be high temperature. In addition, since the fluorite glass is inferior in workability and is very expensive, the usage in a projection zoom lens causes deterioration in yield at the time of production or an increase in manufacturing cost. Therefore, the fluorite glass is not suitable for use in the projection zoom lens.

Next, a specific optical configuration of the projection zoom lens will be described with reference to the first to fourth embodiments. FIGS. 1 to 4 are lens configuration diagrams corresponding to each of the projection zoom lenses ZL which are the first to fourth embodiments of the projection zoom lens, and the lens arrangement at the telephoto end (T) and the like are illustrated in the optical cross-section. The moving locus mk (k=1, 2, . . . , 6) in FIGS. 1 to 4 schematically illustrates the movement/fixing state of the k-th lens group Grk in zooming from the telephoto end (T) to the wide-angle end (W). Arrows mF in FIGS. 1 to 4 illustrate the movement directions of the first lens group Gr1 in focusing of the projection distance from a long distance to a short distance. However, the focusing method is not limited thereto.

The projection zoom lens ZL of the first to fourth embodiments (FIGS. 1 to 4) is a zoom lens for the image projection apparatus that includes, sequentially from the enlargement conjugate side, a first lens group Gr1 having negative refractive power, a second lens group Gr2 having positive or negative refractive power, a third lens group Gr3 having a positive refractive power, a fourth lens group Gr4 having a negative refractive power, a fifth lens group Gr5 having a positive refractive power and a sixth lens group Gr6 having a positive refractive power. Zooming is performed by moving the second lens group Gr2, the third lens group Gr3 and the fifth lens group Gr5 along the optical axis AX. That is, the first to fourth embodiments are a projection zoom lens ZL of six group construction having negative, positive, positive, negative, positive and positive refractive power arrangement or negative, negative, positive, negative, positive and positive refractive power arrangement sequentially from the enlargement conjugate side. The first lens group Gr1, the fourth lens group Gr4 and the sixth lens group Gr6 are set as a fixed group, and the second lens group Gr2, the third lens group Gr3 and the fifth lens group Gr5 are set as a moving group. Since the zoom position of the first lens group Gr1 is fixed, it is possible to suppress the change in the total length of the optical system due to magnification variation, and since the number of moving parts decreases, it is possible to simplify the magnification variation mechanism. Further, the zoom position of the prism PR (for example, a total internal reflection (TIR) prism, a color decomposition/composition prism) positioned on the reduction conjugate side of the sixth lens group Gr6 and the cover glass CG of the image display element is also fixed.

Figure 17:
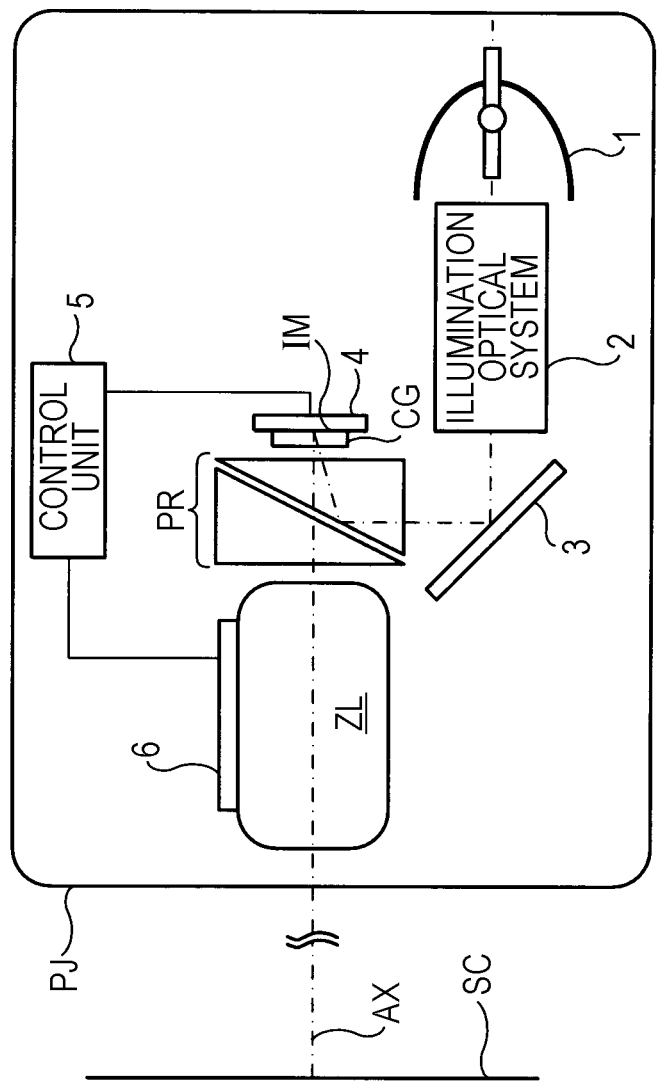
FIG. 17 is a schematic diagram illustrating an embodiment of an image projection apparatus.

Next, an embodiment of an image projection apparatus including the projection zoom lens ZL will be described. FIG. 17 illustrates a schematic configuration example of an image projection apparatus (a single-panel type projector) PJ. The image projection apparatus PJ includes a light source 1, an illumination optical system 2, a reflection mirror 3, a prism PR, an image display element (image forming element) 4, a control unit 5, an actuator 6, a projection zoom lens ZL, and the like. The control unit 5 is a unit that performs the overall control of the image projection apparatus PJ. The image display element 4 is an image modulation element (for example, a digital micromirror device) which modulates light to generate an image, and the cover glass CG is provided on the image display surface IM which displays an image.

Beam emitted from the light source 1 (for example, a white laser light such as a xenon lamp, and a laser light source) is guided to the image display element 4 by the illumination optical system 2, the reflection mirror 3 and the prism PR, and image light is formed in the image display element 4. The prism PR is made up of, for example, a TIR prism (a color decomposition and composition prism or the like), and separates the illumination light and the projection light. The image light formed by the image display element 4 is enlarged and projected toward the screen surface SC by the projection zoom lens ZL. That is, the image displayed on the image display element 4 is enlarged and projected on the screen surface SC by the projection zoom lens ZL.

As described above, the image projection apparatus PJ includes the image display element 4 for displaying an image, the light source 1, the illumination optical system 2 for guiding light from the light source 1 to the image display element 4, and the projection zoom lens ZL for enlarging and projecting the image displayed on the image display element 4 onto the screen surface SC. However, the image projection apparatus to which the projection zoom lens ZL as the projection zoom lens are applicable is not limited thereto. For example, as long as the image display element that displays an image by light emission of the image display surface itself is used, the illumination can be made unnecessary. In that case, the image projection apparatus can be configured without using the light source 1 and the illumination optical system 2.

An actuator 6 which is moved to the enlargement conjugate side or the reduction conjugate side along the optical axis AX is connected to the lens group which moves for zooming and focusing in the projection zoom lens ZL. The control unit 5 for controlling the movement of the moving group is connected to the actuator 6. Further, the lens group may be manually moved, without using the control unit 5 and the actuator 6.

EXAMPLES

Hereinafter, the configuration and the like of the projection zoom lens according to the present invention will be described in more detail with reference to the construction data and the like of the examples. Examples 1 to 4 (EX1 to EX4) listed herein are numerical examples corresponding to the aforementioned first to fourth embodiments, respectively, and the lens configuration diagrams (FIGS. 1 to 4) illustrating the first to fourth embodiments illustrate lens cross-sectional shapes, lens arrangement, and the like of the corresponding Examples 1 to 4, respectively.

In the construction data of each example, as the surface data, the surface number i, a radius of curvature CR (mm), an axial distance Ti (mm), a refractive index nd of the d line (wavelength: 587.56 nm), and an Abbe number vd of the d line are illustrated. Further, symbol ST denotes an aperture stop, symbol IM denotes an image display surface, respectively, and the axial distance Ti with F and Z attached thereto denotes a variable surface distance which changes at the time of focusing and at the time of zooming.

The zoom ratio, the maximum image height (mm), the back focus (BF, mm), the total lens length (mm), the focal length (mm) of the entire system, the half viewing angle (ω, °), the F number and the variable surface distance Ti (mm) which is the group interval are denoted as various data. Regarding data that changes due to zooming, it represents the values at each zoom position T (TELE), M (MIDDLE), and W (WIDE). The back focus BF is expressed as the distance from the last lens surface to the image display surface IM by the air conversion length, and the total lens length is a value obtained by adding the back focus BF to the distance from the foremost surface (i=1) of the projection zoom lens ZL to the last surface of the projection zoom lens ZL. In addition, the maximum image height corresponds to half of the diagonal length of the image display surface IM.

The movement amount (mm) of the zoom group, the movement amount (mm) of the focus group, and the refractive power ($mm^{-1}$) of the zoom group, the focus group and the like are denoted as the lens group data. The movement amount of the zoom group is indicated by the movement amount from the telephoto end T to each of the zoom positions T, M and W, and the movement amount of the focus group is indicated by the movement amount from the infinity focusing state at each of the zoom positions T, M and W to each projection distance (indicated in parentheses after the focus group). The projection distance is the distance from the screen surface SC to the apex of the foremost surface (i=1) of the projection zoom lens ZL.

Tables 1 to 4 indicate the partial dispersion ratios $\theta g\_F$ ($\theta g\_F=(Ng-NF)/(NF-NC)$), the focal length (mm) and the refractive power ($mm^{-1}$) of the j-th lens Lj (j=1, 2, 3, . . . ) for each example. Further, Table 5 indicates values corresponding to Conditional Expressions of the respective examples.

FIGS. 5A to 16D are aberration diagrams corresponding to each of Examples 1 to 4 (EX1 to EX4). FIGS. 5A to 5D, 8A to 8D, 11A to 11D, and 14A to 14D illustrate various aberrations at the telephoto end (T). FIGS. 6A to 6D, 9A to 9D, 12A to 12D, and 15A to 15D illustrate various aberrations at the intermediate position (M, intermediate focal length state). FIGS. 7A to 7D, 10A to 10D, 13A to 13D, and 16A to 16D illustrate various aberrations at the wide-angle end (W). In each of FIGS. 5A to 16D, FIGS. 5A, 6A, 7A, 8A, 9A, 10A, 11A, 12A, 13A, 14A, 15A, and 16A illustrate the spherical aberration (mm), FIGS. 5B, 6B, 7B, 8B, 9B, 10B, 11B, 12B, 13B, 14B, 15B and 16B illustrate the astigmatism (mm), FIGS. 5C, 6C, 7C, 8C, 9C, 10C, 11C, 12C, 13C, 14C, 15C and 16C illustrate the distortion aberration (%), and FIGS. 5D, 6D, 7D, 8D, 9D, 10D, 11D, 12D, 13D, 14D, 15D and 16D illustrate the chromatic aberration of magnification (mm).

In the spherical aberration diagrams of FIGS. 5A, 6A, 7A, 8A, 9A, 10A, 11A, 12A, 13A, 14A, 15A and 16A, the vertical axis represents the value (that is, the relative pupil height) obtained by normalizing the incident height of light beams to the pupil by the maximum height thereof, and the horizontal axis represents the amount of spherical aberration with respect to light beams having wavelengths of 460 nm, 546 nm, and 620 nm as the amount of deviation (mm) in the direction of the optical axis AX from the paraxial image surface. The correspondence between the wavelength and the line type in the spherical aberration diagram is as follows:

Spherical aberration for wavelength of 460 nm: long dashed line

Spherical aberration for wavelength of 546 nm: solid line

Spherical aberration for wavelength of 620 nm: short dashed line

In the astigmatism diagrams of FIGS. 5B, 6B, 7B, 8B, 9B, 10B, 11B, 12B, 13B, 14B, 15B and 16B, the vertical axis represents the paraxial image height (mm), and the horizontal axis represents the sagittal (S) image surface and the meridional (M) image surface for light beams having the wavelengths of 460 nm, 546 nm and 620 nm as the amount of deviation (mm) in the direction of the optical axis AX from the paraxial image surface. The correspondence between the wavelength and the line type in the astigmatism diagram is as follows:

S image surface for wavelength of 460 nm: one dotted line

M image surface for wavelength of 460 nm: dotted line

S image surface for wavelength of 546 nm: long dashed line

M image surface for wavelength of 546 nm: solid line

S image surface for wavelength of 620 nm: two-dotted dashed line

M image surface for wavelength 620 nm: short dashed line

In the distortion aberration diagrams of FIGS. 5C, 6C, 7C, 8C, 9C, 10C, 11C, 12C, 13C, 14C, 15C and 16C, the vertical axis represents the paraxial image height (mm), and the horizontal axis represents the distortion (%) with respect to the light beam having a wavelength of 546 nm.

In the diagrams of chromatic aberration of magnification of FIGS. 5D, 6D, 7D, 8D, 9D, 10D, 11D, 12D, 13D, 14D, 15D and 16D, the vertical axis represents the paraxial image height (mm), and the horizontal axis represents the chromatic aberration of magnification (mm) (Blue-Green) corresponding to the difference between the light beam of the wavelength of 460 nm and the light beam of the wavelength of 546 nm, and the chromatic aberration of magnification (mm) (Red-Green) corresponding to the difference between the light beam of the wavelength of 620 nm and the light beam of the wavelength of 546 nm. The correspondence between the wavelength and the line type in the diagram of chromatic aberration of magnification is as follows:

Chromatic aberration of magnification (Blue-Green): solid line

Chromatic aberration of magnification (Red-Green): dashed line

Examples 1 to 4 are a six group zoom configuration of negative, positive, positive, negative, positive and positive lenses, or a six group zoom configuration of negative, negative, positive, negative, positive and positive lenses. The fourth lens group Gr4 and the sixth lens group Gr6 are fixed to the reduction conjugate side image surface IM. The optical member disposed on the lens back of the reduction conjugate side from the sixth lens group Gr6 is a prism PR on both planes or a cover glass CG of the image display element 4, all of which have the following configurations:

Prism PR: Ti=25.00 mm, nd=1.52, vd=64.20

Air interval: Ti=3.00 mm

Cover glass CG: Ti=1.10 mm, nd=1.49, vd=70.44

Air interval: Ti=0.70 mm

Image Display Element 4

In Examples 1 to 4, the exit pupil distance is 1000 mm or more, and is substantially telecentric. The first lens group Gr1 is fixed at the time of magnification variation (arrows m1 in FIGS. 1 to 4), and a part or the whole thereof moves only for focusing at the time of change of the projection distance. That is, focusing from the long distance side to the short distance side with respect to the screen surface SC is performed, by moving the first lens group Gr1 or a partial group thereof toward the enlargement conjugate side (arrows mF in FIGS. 1 to 4). At the time of magnification variation from the telephoto end (T) to the wide-angle end (W), the third lens group Gr3 and the fifth lens group Gr5 move toward the reduction conjugate side from the enlargement conjugate side, and the second lens group Gr2 moves in a locus which draws an arc that is convex toward the enlargement conjugate side or the reduction conjugate side (arrows m2, m3 and m5 in FIGS. 1 to 4), (when the movement accompanying the magnification variation is expanded). The aperture stop ST is disposed between the fourth lens group Gr4 and the fifth lens group Gr5, and is fixed at the zoom position with respect to the reduction conjugate side image surface IM, together with the fourth lens group Gr4.

Example 1 has a six group zoom configuration of negative, positive, positive, negative, positive and positive lenses including a total of 18 lenses (a first lens L1 to an eighteenth lens L18) in which the first A lens group Gr1A is four positive, negative, negative and negative lenses, the first B lens group Gr1B is one positive lens, the second lens group Gr2 is two negative and positive lenses, the third lens group Gr3 is one positive lens, the fourth lens group Gr4 is three negative, negative and positive lenses, the fifth lens group Gr5 is six positive, negative, positive, positive, negative and positive lenses, and the sixth lens group Gr6 is one positive lens. The planes up to the thirty-seventh plane are the lens units of the projection zoom lens ZL, and the planes subsequent to the thirty-eighth plane are the prism PR or the cover glass CG of the image display element 4. The first lens group Gr1 includes a first A lens group Gr1A and a first B lens group Gr1B. By moving the first A lens group Gr1A to the enlargement conjugate side, focusing from the infinity to the proximity projection distance is performed. At the time of focusing, the position of the first B lens group Gr1B is fixed with respect to the reduction conjugate side image surface IM.

In Example 1, the air conversion distance of the back focus is 39.92 mm, and BF/Fw=1.777. Accordingly, Conditional Expression (2) is satisfied. The positive lens included in the fourth lens group Gr4 is only the eleventh lens L11, and each of the Abbe number and the partial dispersion ratio is as follows:

$\nu dp=22.76$ $\theta g\_Fp=0.629$ $\theta g\_Fp+0.004\times \nu dp=0.720$

Thus, Conditional Expressions (1) and (2) are satisfied.
In Example 1, each of the refractive power of the eleventh lens L11 and the refractive power of the fourth lens group Gr4 is as follows:

$\Phi p=0.012$ $\Phi 4=-0.009$ $|\Phi p/\Phi 4|=1.337$ $|\Phi 4/\Phi w|=0.210$

Thus, Conditional Expressions (4) and (5) are satisfied.
In Example 1, each of the Abbe number and the partial dispersion ratio of the ninth lens L9 among the negative lenses included in the fourth lens group Gr4 is as follows:

$\nu dn=70.44$ $\theta g\_Fn=0.531$ $\theta g\_Fn+0.001682\times \nu dn=0.649$

Thus, Conditional Expressions (6) and (7) are satisfied.
In Example 1, each of the Abbe number and the partial dispersion ratio of the tenth lens L10 among the negative lenses included in the fourth lens group Gr4 is as follows:

$\nu dn=52.15$ $\theta g\_Fn=0.559$ $\theta g\_Fn+0.001682\times \nu dn=0.647$

Thus, Conditional Expression (6) is satisfied, but Conditional Expression (7) is not satisfied.

Example 2 has a six group zoom configuration of negative, positive, positive, negative, positive and positive lenses including a total of 18 lenses (a first lens L1 to an eighteenth lens L18) in which the first A lens group Gr1A is four positive, negative, negative and negative lenses, the first B lens group Gr1B is one positive lens, the second lens groups Gr2 is two negative and positive lenses, the third lens group Gr3 is one positive lens, the fourth lens group Gr4 is three negative, negative and positive lenses, the fifth lens group Gr5 is six positive, negative, positive, positive, negative and positive lenses, and the sixth lens group Gr6 is one positive lens. The planes up to the thirty-seventh plane are the lens units of the projection zoom lens ZL, and the planes subsequent to the thirty-eighth plane are the prism PR or the cover glass CG of the image display element 4. The first lens group Gr1 includes a first A lens group Gr1A and a first B lens group Gr1B. By moving the first A lens group Gr1A to the enlargement conjugate side, focusing from the infinity to the proximity projection distance is performed. At the time of focusing, the position of the first B lens group Gr1B is fixed with respect to the reduction conjugate side image surface IM.

In Example 2, the air conversion distance of the back focus is 39.92 mm, and BF/Fw=1.088. Accordingly, Conditional Expression (2) is satisfied. The positive lens included in the fourth lens group Gr4 is only the eleventh lens L11, and each of the Abbe number and the partial dispersion ratio is as follows:

$\nu dp=22.76$ $\theta g\_Fp=0.629$ $\theta g\_Fp+0.004\times \nu dp=0.720$

Thus, Conditional Expressions (1) and (2) are satisfied.
In Example 2, each of the refractive power of the eleventh lens L11 and the refractive power of the fourth lens group Gr4 is as follows:

$\Phi p=0.012$ $\Phi 4=-0.014$ $|\Phi p/\Phi 4|=0.856$ $|\Phi 4/\Phi w|=0.500$

Thus, Conditional Expressions (4) and (5) are satisfied.

In Example 2, the negative lenses included in the fourth lens group Gr4 are the ninth lens L9 and the tenth lens L10. The ninth lens L9 and the tenth lens L10 are made of the same glass material, and each of the Abbe number and the partial dispersion ratio is as follows:

$\nu dn=64.20$ $\theta g\_Fn=0.534$ $\theta g\_Fn+0.001682\times\nu dn=0.642$

Thus, Conditional Expression (7) is satisfied, but Conditional Expression (6) is not satisfied.

Example 3 has a six group zoom configuration of negative, negative, positive, negative, positive, and positive lenses including a total of 20 lenses (a first lens L1 to a twentieth lens L20) in which the first A lens group Gr1A is three negative, negative and positive lenses, the first B lens group Gr1B is four negative, negative, positive and negative lenses, the second lens groups Gr2 is one negative lens, the third lens group Gr3 is two positive and positive lenses, the fourth lens group Gr4 is three negative, negative and positive lenses, the fifth lens group Gr5 is six positive, negative, positive, positive, negative and positive lenses, and the sixth lens group Gr6 is one positive lens. The planes up to the thirty-ninth plane are the lens units of the projection zoom lens ZL, and the planes subsequent to the fortieth plane are the prism PR or the cover glass CG of the image display element 4. The first lens group Gr1 includes a first A lens group Gr1A and a first B lens group Gr1B. By moving the first B lens group Gr1B to the enlargement conjugate side, focusing from the infinity to the proximity projection distance is performed. At the time of focusing, the position of the first A lens group Gr1A is fixed with respect to the reduction conjugate side image surface IM.

In Example 3, the air conversion distance of the back focus is 39.92 mm, and BF/Fw=2.611. Accordingly, Conditional Expression (2) is satisfied. The positive lens included in the fourth lens group Gr4 is only the thirteenth lens L13, and each of the Abbe number and the partial dispersion ratio is as follows:

$\nu dp=22.76$ $\theta g\_Fp=0.629$ $\theta g\_Fp+0.004\times\nu dp=0.720$

Thus, Conditional Expressions (1) and (2) are satisfied.

In Example 3, each of the refractive power of the thirteenth lens L13 and the refractive power of the fourth lens group Gr4 is as follows:

$\Phi p=0.017$ $\Phi 4=-0.015$ $|\Phi p/\Phi 4|=1.101$ $|\Phi 4/\Phi w|=0.236$

Thus, Conditional Expressions (4) and (5) are satisfied.

In Example 3, each of the Abbe number and the partial dispersion ratio of the eleventh lens L11 among the negative lenses included in the fourth lens group Gr4 is as follows:

$\nu dn=81.61$ $\theta g\_Fn=0.539$ $\theta g\_Fn+0.001682\times\nu dn=0.676$

Thus, Conditional Expressions (6) and (7) are satisfied.

In the third embodiment, each of the Abbe number and the partial dispersion ratio of the twelfth lens L12 among the negative lenses included in the fourth lens group Gr4 is as follows:

$\nu dn=70.44$ $\theta g\_Fn=0.531$ $\theta g\_Fn+0.001682\times\nu dn=0.649$

Thus, Conditional Expressions (6) and (7) are satisfied.

Example 4 has a six group zoom configuration of negative, positive, positive, negative, positive and positive lenses including a total of 16 lenses (a first lens L1 to a sixteenth lens L16) in which the first lens group Gr1 is four positive, negative, negative and negative lenses, the second lens groups Gr2 is two negative and positive lenses, the third lens group Gr3 is one positive lens, the fourth lens group Gr4 is two negative and positive lenses, the fifth lens group Gr5 is six positive, negative, positive, positive, negative and positive lenses, and the sixth lens group Gr6 is one positive lens. The planes up to the thirty-third plane are the lens units of the projection zoom lens ZL, and the planes subsequent to the thirty-fourth plane are the prism PR or the cover glass CG of the image display element 4. By moving the first lens group Gr1 to the enlargement conjugate side, focusing from the infinity to the proximity projection distance is performed.

In Example 4, the air conversion distance of the back focus is 38.89 mm, and BF/Fw=1.918. Accordingly, Conditional Expression (2) is satisfied. The positive lens included in the fourth lens group Gr4 is only the ninth lens L9, and each of the Abbe number and the partial dispersion ratio is as follows:

$\nu dp=22.76$ $\theta g\_Fp=0.629$ $\theta g\_Fp+0.004\times\nu dp=0.720$

Thus, Conditional Expressions (1) and (2) are satisfied.

In Example 4, each of the refractive power of the ninth lens L9 and the refractive power of the fourth lens group Gr4 is as follows:

$\Phi p=0.013$ $\Phi 4=-0.009$ $|\Phi p/\Phi 4|=1.415$ $|\Phi 4/\Phi w|=0.188$

Thus, Conditional Expressions (4) and (5) are satisfied.

In Example 4, the negative lens included in the fourth lens group Gr4 is only the eighth lens L8, and each of the Abbe number and the partial dispersion ratio is as follows:

$\nu dn=60.69$ $\theta g\_Fn=0.541$ $\theta g\_Fn+0.001682\times\nu dn=0.643$

Thus, Conditional Expression (7) is satisfied, but Conditional Expression (6) is not satisfied.

Further, when the projection zoom lens ZL of each example is used for an image projection apparatus (for example, a liquid crystal projector) PJ, the screen surface (projected surface) SC is originally an image surface and the image display surface IM (for example, the liquid crystal panel surface) is an object surface. However, in each of the examples, a reduction system is provided in terms of optical design, and the optical performance is evaluated on the image display surface (reduction conjugate side image surface) IM, while regarding the screen surface SC (FIG. 17) as the object surface. As it is understood from the obtained optical performance, the projection zoom lens ZL of each embodiment is suitably usable not only as a projection lens for an image projection apparatus, but also as an imaging lens for an imaging apparatus (for example, a video camera, and a digital camera).

First Example

Unit: mm

Surface data

| i | CR | Ti | nd | vd |
|---|---|---|---|---|
| 1 | 94.14 | 11.16 | 1.52 | 64.20 |
| 2 | −43786.25 | 0.20 | | |
| 3 | 85.92 | 3.68 | 1.59 | 61.25 |
| 4 | 40.07 | 11.43 | | |
| 5 | 260.81 | 2.76 | 1.50 | 81.61 |
| 6 | 42.43 | 14.67 | | |
| 7 | −49.22 | 2.46 | 1.70 | 30.05 |
| 8 | 282.87 | variable (F) | | |
| 9 | −89.98 | 4.83 | 1.81 | 40.73 |
| 10 | −46.89 | variable (Z) | | |
| 11 | −50.49 | 2.39 | 1.57 | 42.84 |
| 12 | 464.22 | 2.01 | | |
| 13 | 842.62 | 6.02 | 1.73 | 54.67 |
| 14 | −63.02 | variable (Z) | | |
| 15 | 66.56 | 5.02 | 1.77 | 49.62 |
| 16 | 771.19 | variable (Z) | | |
| 17 | 145.30 | 2.30 | 1.49 | 70.44 |
| 18 | 42.14 | 6.35 | | |
| 19 | −50.67 | 2.15 | 1.52 | 52.15 |
| 20 | 90.24 | 6.70 | | |
| 21 | 96.56 | 4.15 | 1.81 | 22.76 |
| 22 | −198.04 | 2.02 | | |
| 23 (ST) | ∞ | variable (Z) | | |
| 24 | 779.38 | 7.64 | 1.44 | 95.10 |
| 25 | −31.00 | 2.46 | | |
| 26 | −28.23 | 1.89 | 1.81 | 33.27 |
| 27 | −70.29 | 1.00 | | |
| 28 | 75.76 | 7.15 | 1.50 | 81.61 |
| 29 | −58.54 | 16.67 | | |
| 30 | 119.50 | 4.78 | 1.55 | 75.50 |
| 31 | −75.87 | 4.82 | | |
| 32 | −55.53 | 1.80 | 1.81 | 40.73 |
| 33 | 41.84 | 4.27 | | |
| 34 | 52.38 | 8.89 | 1.44 | 95.10 |
| 35 | −50.69 | variable (Z) | | |
| 36 | 61.46 | 4.66 | 1.70 | 55.46 |
| 37 | ∞ | 19.00 | | |
| 38 | ∞ | 25.00 | 1.52 | 64.20 |
| 39 | ∞ | 3.00 | | |
| 40 | ∞ | 1.10 | 1.49 | 70.44 |
| 41 | ∞ | 0.70 | | |
| 42 (IM) | ∞ | | | |

Various data

| Zoom ratio | 1.63 |
|---|---|
| Maximum image height | 12.00 |
| BF | 39.92 |
| Total lens length | 236.00 |

| | TELE | MIDDLE | WIDE |
|---|---|---|---|
| Focal length | 36.70 | 28.71 | 22.47 |
| Half viewing angle ω | 18.11 | 22.68 | 28.11 |
| F number | 2.48 | 2.27 | 2.10 |

-continued

Unit: mm

Group interval

| T8 | 9.80 | 9.80 | 9.80 |
|---|---|---|---|
| T10 | 6.97 | 6.82 | 34.47 |
| T14 | 1.00 | 18.09 | 3.29 |
| T16 | 39.34 | 22.40 | 9.55 |
| T23 | 3.88 | 12.89 | 21.55 |
| T35 | 18.67 | 9.66 | 1.00 |

Lens group data

Amount of zoom group movement (TELE standard)

| | TELE | MIDDLE | WIDE | Refractive power |
|---|---|---|---|---|
| Gr1 | 0.000 | 0.000 | 0.000 | −0.016 |
| Gr2 | 0.000 | −0.154 | 27.504 | 0.001 |
| Gr3 | 0.000 | 16.937 | 29.790 | 0.011 |
| Gr4 | 0.000 | 0.000 | 0.000 | −0.009 |
| Gr5 | 0.000 | 9.006 | 17.668 | 0.011 |
| Gr6 | 0.000 | 0.000 | 0.000 | 0.011 |

Amount of focus group movement (infinity focusing standard)

| | TELE | MIDDLE | WIDE | Refractive power |
|---|---|---|---|---|
| Gr1A (∞) | 0.000 | 0.000 | 0.000 | −0.030 |
| Gr1A (3.3 m) | −0.326 | −0.330 | −0.332 | −0.030 |
| Gr1B | 0.000 | 0.000 | 0.000 | 0.009 |

Second Example

Unit: mm

Surface data

| i | CR | Ti | nd | vd |
|---|---|---|---|---|
| 1 | 60.86 | 14.33 | 1.71 | 53.94 |
| 2 | 528.23 | 0.22 | | |
| 3 | 163.94 | 5.79 | 1.49 | 70.44 |
| 4 | 36.89 | 13.62 | | |
| 5 | −510.39 | 2.56 | 1.54 | 47.20 |
| 6 | 103.44 | 7.37 | | |
| 7 | −74.62 | 2.51 | 1.65 | 33.84 |
| 8 | 76.74 | variable (F) | | |
| 9 | −82.40 | 4.20 | 1.74 | 49.22 |
| 10 | −47.87 | variable (Z) | | |
| 11 | −47.15 | 2.41 | 1.54 | 47.20 |
| 12 | −124.33 | 0.20 | | |
| 13 | −637.74 | 4.93 | 1.62 | 63.39 |
| 14 | −66.34 | variable (Z) | | |
| 15 | 62.02 | 5.53 | 1.62 | 63.39 |
| 16 | 37744.75 | variable (Z) | | |
| 17 | −160.67 | 1.76 | 1.52 | 64.20 |
| 18 | 61.67 | 5.24 | | |
| 19 | −64.18 | 2.29 | 1.52 | 64.20 |
| 20 | 81.83 | 2.14 | | |
| 21 | 89.01 | 3.47 | 1.81 | 22.76 |
| 22 | −321.35 | 1.57 | | |
| 23 (ST) | ∞ | variable (Z) | | |
| 24 | 457.79 | 8.35 | 1.44 | 95.10 |
| 25 | −30.74 | 2.25 | | |
| 26 | −28.93 | 1.95 | 1.81 | 33.27 |
| 27 | −50.24 | 1.00 | | |
| 28 | 48.49 | 6.89 | 1.50 | 81.61 |
| 29 | −127.83 | 14.67 | | |
| 30 | 322.35 | 4.34 | 1.44 | 95.10 |
| 31 | −58.25 | 4.97 | | |
| 32 | −43.03 | 1.69 | 1.60 | 38.01 |
| 33 | 36.66 | 9.50 | | |

-continued

Unit: mm

| | | | | |
|---|---|---|---|---|
| 34 | 56.23 | 7.77 | 1.44 | 95.10 |
| 35 | −65.81 | variable (Z) | | |
| 36 | 69.95 | 4.15 | 1.74 | 49.22 |
| 37 | ∞ | 19.00 | | |
| 38 | ∞ | 25.00 | 1.52 | 64.20 |
| 39 | ∞ | 3.00 | | |
| 40 | ∞ | 1.10 | 1.49 | 70.44 |
| 41 | ∞ | 0.70 | | |
| 42 (IM) | ∞ | | | |

Various data

| | |
|---|---|
| Zoom ratio | 1.63 |
| Maximum image height | 12.00 |
| BF | 39.92 |
| Total lens length | 230.00 |

| | TELE | MIDDLE | WIDE |
|---|---|---|---|
| Focal length | 59.92 | 46.88 | 36.70 |
| Half viewing angle ω | 11.32 | 14.36 | 18.11 |
| F number | 2.52 | 2.30 | 2.10 |
| Group interval | | | |
| T8 | 12.63 | 12.63 | 12.63 |
| T10 | 7.13 | 7.13 | 21.89 |
| T14 | 1.00 | 16.79 | 14.96 |
| T16 | 42.48 | 26.69 | 13.78 |
| T23 | 3.20 | 10.32 | 18.07 |
| T35 | 15.87 | 8.76 | 1.00 |

Lens group data

Amount of zoom group movement (TELE standard)

| | TELE | MIDDLE | WIDE | Refractive power |
|---|---|---|---|---|
| Gr1 | 0.000 | 0.000 | 0.000 | −0.010 |
| Gr2 | 0.000 | −0.001 | 14.752 | 0.002 |
| Gr3 | 0.000 | 15.793 | 28.708 | 0.010 |
| Gr4 | 0.000 | 0.000 | 0.000 | −0.014 |
| Gr5 | 0.000 | 7.116 | 14.871 | 0.013 |
| Gr6 | 0.000 | 0.000 | 0.000 | 0.011 |

Amount of focus group movement (infinity focusing standard)

| | TELE | MIDDLE | WIDE | Refractive power |
|---|---|---|---|---|
| Gr1A (∞) | 0.000 | 0.000 | 0.000 | −0.018 |
| Gr1A (5.4 m) | −0.543 | −0.551 | −0.557 | −0.018 |
| Gr1B | 0.000 | 0.000 | 0.000 | 0.007 |

Third Example

Unit: mm

Surface data

| i | CR | Ti | nd | νd |
|---|---|---|---|---|
| 1 | 96.63 | 5.40 | 1.83 | 37.34 |
| 2 | 54.86 | 15.67 | | |
| 3 | 98.80 | 4.40 | 1.83 | 37.34 |
| 4 | 54.97 | 8.88 | | |
| 5 | 60.59 | 19.08 | 1.91 | 35.25 |
| 6 | −4132.63 | variable (F) | | |
| 7 | 90.20 | 3.37 | 1.81 | 25.46 |
| 8 | 31.44 | 14.13 | | |
| 9 | 219.36 | 3.52 | 1.81 | 22.76 |
| 10 | 43.85 | 14.75 | | |
| 11 | 75.34 | 14.59 | 1.49 | 70.44 |

-continued

Unit: mm

| | | | | |
|---|---|---|---|---|
| 12 | −42.61 | 0.20 | | |
| 13 | −135.24 | 2.24 | 1.50 | 81.61 |
| 14 | 65.22 | variable (Z) | | |
| 15 | −86.84 | 2.89 | 1.50 | 81.61 |
| 16 | 1395.99 | variable (Z) | | |
| 17 | 182.91 | 5.11 | 1.73 | 54.67 |
| 18 | −79.88 | 0.20 | | |
| 19 | 54.34 | 3.12 | 1.79 | 43.93 |
| 20 | 129.78 | variable (Z) | | |
| 21 | −70.95 | 1.42 | 1.50 | 81.61 |
| 22 | 34.51 | 7.27 | | |
| 23 | −53.62 | 1.99 | 1.49 | 70.44 |
| 24 | 111.88 | 1.49 | | |
| 25 | 74.44 | 4.18 | 1.81 | 22.76 |
| 26 | −131.65 | 1.11 | | |
| 27 (ST) | ∞ | variable (Z) | | |
| 28 | 160.79 | 8.36 | 1.44 | 95.10 |
| 29 | −32.16 | 2.56 | | |
| 30 | −28.86 | 1.91 | 1.79 | 43.93 |
| 31 | −74.84 | 1.00 | | |
| 32 | 228.12 | 6.52 | 1.50 | 81.61 |
| 33 | −45.11 | 3.32 | | |
| 34 | 71.49 | 7.34 | 1.44 | 95.10 |
| 35 | −63.83 | 3.89 | | |
| 36 | −66.19 | 1.95 | 1.76 | 26.61 |
| 37 | 38.78 | 2.46 | | |
| 38 | 44.44 | 7.40 | 1.44 | 95.10 |
| 39 | −109.62 | variable (Z) | | |
| 40 | 50.27 | 5.90 | 1.62 | 63.39 |
| 41 | ∞ | 19.00 | | |
| 42 | ∞ | 25.00 | 1.52 | 64.20 |
| 43 | ∞ | 3.00 | | |
| 44 | ∞ | 1.10 | 1.49 | 70.44 |
| 45 | ∞ | 0.70 | | |
| 46 (IM) | ∞ | | | |

Various data

| | |
|---|---|
| Zoom ratio | 1.50 |
| Maximum image height | 12.00 |
| BF | 39.92 |
| Total lens length | 265.00 |

| | TELE | MIDDLE | WIDE |
|---|---|---|---|
| Focal length | 22.93 | 18.73 | 15.29 |
| Half viewing angle ω | 27.63 | 32.65 | 38.13 |
| F number | 2.34 | 2.22 | 2.10 |
| Group interval | | | |
| T6 | 2.03 | 2.03 | 2.03 |
| T14 | 14.72 | 17.42 | 15.43 |
| T16 | 8.62 | 13.64 | 22.66 |
| T20 | 19.99 | 12.28 | 5.27 |
| T27 | 19.75 | 25.37 | 30.88 |
| T39 | 13.37 | 7.74 | 2.23 |

Lens group data

Amount of zoom group movement (TELE standard)

| | TELE | MIDDLE | WIDE | Refractive power |
|---|---|---|---|---|
| Gr1 | 0.000 | 0.000 | 0.000 | −0.021 |
| Gr2 | 0.000 | 2.685 | 0.682 | −0.006 |
| Gr3 | 0.000 | 7.710 | 14.724 | 0.022 |

-continued

Unit: mm

| | | | | |
|---|---|---|---|---|
| Gr4 | 0.000 | 0.000 | 0.000 | −0.015 |
| Gr5 | 0.000 | 5.624 | 11.135 | 0.011 |
| Gr6 | 0.000 | 0.000 | 0.000 | 0.012 |

Amount of focus group movement
(infinity focusing standard)

| | TELE | MIDDLE | WIDE | Refractive power |
|---|---|---|---|---|
| Gr1A | 0.000 | 0.000 | 0.000 | 0.005 |
| Gr1B (∞) | 0.000 | 0.000 | 0.000 | −0.023 |
| Gr1B (2.2 m) | −0.966 | −0.983 | −0.997 | −0.023 |

Fourth Example

Unit: mm

Surface data

| i | CR | Ti | nd | νd |
|---|---|---|---|---|
| 1 | 82.48 | 9.58 | 1.52 | 64.20 |
| 2 | −10423.68 | 0.20 | | |
| 3 | 64.18 | 2.77 | 1.59 | 61.25 |
| 4 | 31.84 | 9.03 | | |
| 5 | 96.55 | 2.14 | 1.74 | 49.22 |
| 6 | 38.29 | 12.24 | | |
| 7 | −42.99 | 2.09 | 1.58 | 40.89 |
| 8 | 501.30 | variable (F, Z) | | |
| 9 | −56.82 | 2.80 | 1.81 | 22.76 |
| 10 | 93.06 | 2.89 | | |
| 11 | 156.12 | 7.84 | 1.91 | 35.25 |
| 12 | −46.18 | variable (Z) | | |
| 13 | 72.04 | 4.07 | 1.74 | 49.22 |
| 14 | −239.38 | variable (Z) | | |
| 15 | −110.96 | 1.46 | 1.60 | 60.69 |
| 16 | 34.70 | 2.63 | | |
| 17 | 40.53 | 3.03 | 1.81 | 22.76 |
| 18 | 112.50 | 2.96 | | |
| 19 (ST) | ∞ | variable (Z) | | |
| 20 | 29.18 | 8.55 | 1.50 | 81.61 |
| 21 | −49.69 | 4.13 | | |
| 22 | −33.52 | 1.50 | 1.66 | 50.85 |
| 23 | 27.82 | 5.91 | | |
| 24 | 118.12 | 5.61 | 1.50 | 81.61 |
| 25 | −43.24 | 0.20 | | |
| 26 | 59.97 | 9.25 | 1.50 | 81.61 |
| 27 | −29.10 | 0.35 | | |
| 28 | −39.50 | 1.76 | 1.81 | 33.27 |
| 29 | 52.88 | 3.03 | | |
| 30 | 77.18 | 6.38 | 1.50 | 81.61 |
| 31 | −60.35 | variable (Z) | | |
| 32 | 49.91 | 5.75 | 1.62 | 63.39 |
| 33 | −285.13 | 17.97 | | |
| 34 | ∞ | 25.00 | 1.52 | 64.20 |
| 35 | ∞ | 3.00 | | |
| 36 | ∞ | 1.10 | 1.49 | 70.44 |
| 37 | ∞ | 0.70 | | |
| 38 (IM) | ∞ | | | |

Various data

| | |
|---|---|
| Zoom ratio | 1.48 |
| Maximum image height | 11.34 |

-continued

Unit: mm

| | |
|---|---|
| BF | 38.89 |
| Total lens length | 186.00 |

| | TELE | MIDDLE | WIDE |
|---|---|---|---|
| Focal length | 30.03 | 24.67 | 20.27 |
| Half viewing angle ω | 20.69 | 24.69 | 29.22 |
| F number | 2.33 | 2.22 | 2.10 |
| Group interval | | | |
| T8 | 5.95 | 5.91 | 9.06 |
| T12 | 19.87 | 31.51 | 38.23 |
| T14 | 25.47 | 13.88 | 4.00 |
| T19 | 2.44 | 8.41 | 15.54 |
| T31 | 14.10 | 8.13 | 1.00 |

Lens group data

Amount of zoom group movement
(TELE standard)

| | TELE | MIDDLE | WIDE | Refractive power |
|---|---|---|---|---|
| Gr1 | 0.000 | 0.000 | 0.000 | −0.030 |
| Gr2 | 0.000 | −0.039 | 3.111 | 0.006 |
| Gr3 | 0.000 | 11.591 | 21.468 | 0.013 |
| Gr4 | 0.000 | 0.000 | 0.000 | −0.009 |
| Gr5 | 0.000 | 5.968 | 13.097 | 0.009 |
| Gr6 | 0.000 | 0.000 | 0.000 | 0.015 |

Amount of focus group movement
(infinity focusing standard)

| | TELE | MIDDLE | WIDE | Refractive power |
|---|---|---|---|---|
| Gr1 (∞) | 0.000 | 0.000 | 0.000 | −0.030 |
| Gr1 (2.6 m) | −0.410 | −0.414 | −0.417 | −0.030 |

TABLE 1

Example 1

| i | Grk | Lj | θg_F | Focal length | Refractive power |
|---|---|---|---|---|---|
| 1-2 | Gr1 | Gr1A L1 | 0.534 | 181.11 | 0.006 |
| 3-4 | | L2 | 0.540 | −130.84 | −0.008 |
| 5-6 | | L3 | 0.539 | −102.09 | −0.010 |
| 7-8 | | L4 | 0.603 | −59.33 | −0.017 |
| 9-10 | | Gr1B L5 | 0.567 | 114.99 | 0.009 |
| 11-12 | Gr2 | L6 | 0.574 | −79.69 | −0.013 |
| 13-14 | | L7 | 0.545 | 80.29 | 0.012 |
| 15-16 | Gr3 | L8 | 0.550 | 93.56 | 0.011 |
| 17-18 | Gr4 | L9 | 0.531 | −122.23 | −0.008 |
| 19-20 | | L10 | 0.559 | −62.11 | −0.016 |
| 21-22 | | L11 | 0.629 | 80.01 | 0.012 |
| 23 | | ST | | | |
| 24-25 | Gr5 | L12 | 0.533 | 68.26 | 0.015 |
| 26-27 | | L13 | 0.588 | −59.32 | −0.017 |
| 28-29 | | L14 | 0.539 | 67.44 | 0.015 |
| 30-31 | | L15 | 0.305 | 84.80 | 0.012 |
| 32-33 | | L16 | 0.567 | −29.19 | −0.034 |
| 34-35 | | L17 | 0.533 | 60.38 | 0.017 |
| 36-37 | Gr6 | L18 | 0.543 | 87.83 | 0.011 |
| 38-39 | | PR | 0.534 | | |
| 40-41 | | CG | 0.531 | | |
| 42 | | IM | | | |

TABLE 2

Example 2

| i | Grk | | Lj | θg_F | Focal length | Refractive power |
|---|---|---|---|---|---|---|
| 1-2 | Gr1 | Gr1A | L1 | 0.544 | 94.83 | 0.011 |
| 3-4 | | | L2 | 0.531 | -98.81 | -0.010 |
| 5-6 | | | L3 | 0.568 | -158.03 | -0.006 |
| 7-8 | | | L4 | 0.592 | -57.63 | -0.017 |
| 9-10 | | Gr1B | L5 | 0.549 | 145.36 | 0.007 |
| 11-12 | Gr2 | | L6 | 0.568 | -141.33 | -0.007 |
| 13-14 | | | L7 | 0.540 | 118.97 | 0.008 |
| 15-16 | Gr3 | | L8 | 0.540 | 100.14 | 0.010 |
| 17-18 | Gr4 | | L9 | 0.534 | -85.68 | -0.012 |
| 19-20 | | | L10 | 0.534 | -68.97 | -0.014 |
| 21-22 | | | L11 | 0.629 | 85.70 | 0.012 |
| 23 | | | ST | | | |
| 24-25 | Gr5 | | L12 | 0.533 | 66.09 | 0.015 |
| 26-27 | | | L13 | 0.588 | -87.60 | -0.011 |
| 28-29 | | | L14 | 0.539 | 71.46 | 0.014 |
| 30-31 | | | L15 | 0.533 | 113.00 | 0.009 |
| 32-33 | | | L16 | 0.583 | -32.35 | -0.031 |
| 34-35 | | | L17 | 0.533 | 70.58 | 0.014 |
| 36-37 | Gr6 | | L18 | 0.549 | 93.66 | 0.011 |
| 38-39 | | | PR | 0.534 | | |
| 40-41 | | | CG | 0.531 | | |
| 42 | | | IM | | | |

TABLE 3

Example 3

| i | Grk | | Lj | θg_F | Focal length | Refractive power |
|---|---|---|---|---|---|---|
| 1-2 | Gr1 | Gr1A | L1 | 0.579 | -160.67 | -0.006 |
| 3-4 | | | L2 | 0.579 | -154.76 | -0.006 |
| 5-6 | | | L3 | 0.582 | 65.26 | 0.015 |
| 7-8 | | Gr1B | L4 | 0.616 | -60.95 | -0.016 |
| 9-10 | | | L5 | 0.629 | -67.73 | -0.015 |
| 11-12 | | | L6 | 0.531 | 58.00 | 0.017 |
| 13-14 | | | L7 | 0.539 | -87.95 | -0.011 |
| 15-16 | Gr2 | | L8 | 0.539 | -163.92 | -0.006 |
| 17-18 | Gr3 | | L9 | 0.545 | 76.55 | 0.013 |
| 19-20 | | | L10 | 0.561 | 116.17 | 0.009 |
| 21-22 | Gr4 | | L11 | 0.539 | -46.37 | -0.022 |
| 23-24 | | | L12 | 0.531 | -73.81 | -0.014 |
| 25-26 | | | L13 | 0.629 | 58.78 | 0.017 |
| 27 | | | ST | | | |
| 28-29 | Gr5 | | L14 | 0.533 | 61.99 | 0.016 |
| 30-31 | | | L15 | 0.561 | -60.57 | -0.017 |
| 32-33 | | | L16 | 0.539 | 76.17 | 0.013 |
| 34-35 | | | L17 | 0.539 | 78.26 | 0.013 |
| 36-37 | | | L18 | 0.612 | -31.56 | -0.032 |
| 38-39 | | | L19 | 0.533 | 73.25 | 0.014 |
| 40-41 | Gr6 | | L20 | 0.540 | 81.03 | 0.012 |
| 42-43 | | | PR | 0.534 | | |
| 44-45 | | | CG | 0.531 | | |
| 46 | | | IM | | | |

TABLE 4

Example 4

| i | Grk | Lj | θg_F | Focal length | Refractive power |
|---|---|---|---|---|---|
| 1-2 | Gr1 | L1 | 0.534 | 157.81 | 0.006 |
| 3-4 | | L2 | 0.540 | -110.35 | -0.009 |
| 5-6 | | L3 | 0.549 | -86.31 | -0.012 |
| 7-8 | | L4 | 0.577 | -67.62 | -0.015 |
| 9-10 | Gr2 | L5 | 0.629 | -42.85 | -0.023 |
| 11-12 | | L6 | 0.582 | 39.60 | 0.025 |
| 13-14 | Gr3 | L7 | 0.549 | 74.55 | 0.013 |
| 15-16 | Gr4 | L8 | 0.541 | -43.50 | -0.023 |

TABLE 4-continued

Example 4

| i | Grk | Lj | θg_F | Focal length | Refractive power |
|---|---|---|---|---|---|
| 17-18 | | L9 | 0.629 | 76.15 | 0.013 |
| 19 | | ST | | | |
| 20-21 | Gr5 | L10 | 0.539 | 38.27 | 0.026 |
| 22-23 | | L11 | 0.558 | -22.76 | -0.044 |
| 24-25 | | L12 | 0.539 | 64.25 | 0.016 |
| 26-27 | | L13 | 0.539 | 40.71 | 0.025 |
| 28-29 | | L14 | 0.588 | -27.62 | -0.036 |
| 30-31 | | L15 | 0.539 | 69.01 | 0.014 |
| 32-33 | Gr6 | L16 | 0.540 | 68.93 | 0.015 |
| 34-35 | | PR | 0.534 | | |
| 36-37 | | CG | 0.531 | | |
| 38 | | IM | | | |

TABLE 5

| | Conditional Expression | | Example 1 | | Example 2 |
|---|---|---|---|---|---|
| (1) | θg_Fp + 0.004 × vdp | L11 | 0.720 | L11 | 0.720 |
| (2) | vdp | | 22.760 | | 22.760 |
| (3) | BF/Fw | | 1.777 | | 1.088 |
| (4) | \|Φp/Φ4\| | | 1.337 | | 0.856 |
| (5) | \|Φ4/Φw\| | | 0.210 | | 0.500 |
| (6) | θg_Fn + 0.001682 × vd | L9 | 0.649 | L9 | 0.642 |
| (7) | vdn | | 70.440 | | 64.200 |
| (6) | θg_Fn + 0.001682 × vd | L10 | 0.647 | L10 | 0.642 |
| (7) | vdn | | 52.150 | | 64.200 |

| | Conditional Expression | | Example 3 | | Example 4 |
|---|---|---|---|---|---|
| (1) | θg_Fp + 0.004 × vdp | L13 | 0.720 | L9 | 0.720 |
| (2) | vdp | | 22.760 | | 22.760 |
| (3) | BF/Fw | | 2.611 | | 1.918 |
| (4) | \|Φp/Φ4\| | | 1.101 | | 1.415 |
| (5) | \|Φ4/Φw\| | | 0.236 | | 0.188 |
| (6) | θg_Fn + 0.001682 × vd | L11 | 0.676 | L8 | 0.643 |
| (7) | vdn | | 81.610 | | 60.690 |
| (6) | θg_Fn + 0.001682 × vd | L12 | 0.649 | | |
| (7) | vdn | | 70.440 | | |

Although the present invention has been described and illustrated in detail, it is clearly understood that the same is by way of illustrated and example only and is not to be taken by way of limitation, the scope of the present invention being interpreted by terms of the appended claims.

What is claimed is:

1. A projection zoom lens comprising, sequentially from an enlargement conjugate side: a first lens group having negative refractive power; a second lens group having positive or negative refractive power; a third lens group having positive refractive power; a fourth lens group having negative refractive power; a fifth lens group having positive refractive power; and a sixth lens group having positive refractive power, and configured to perform a magnification variation by changing the interval between the respective lens groups, wherein the fourth lens group comprises at least one positive lens and at least one negative lens, at least one of the positive lenses included in the fourth lens group satisfies the following Conditional Expressions (1) and (2), and the back focus of the entire projection zoom lenses satisfies the following Conditional Expression (3):

$$0.71 \leq \theta g\_Fp + 0.004 \times vdp \leq 0.73 \quad (1)$$

$$15 \leq vdp \leq 25 \quad (2)$$

$$1.0 \leq BF/Fw \leq 2.7 \quad (3)$$

where

θg_Fp: partial dispersion ratio of lens material,
θg_Fp=(Ng−NF)/(NF−NC)
Ng: refractive index of g line,
NF: refractive index of F line,
NC: refractive index of C line,
vdp: Abbe number of the lens material,
BF: air conversion back focus from the last lens surface to the image surface, and
Fw: focal length of the entire projection zoom lenses at the wide-angle end.

2. The projection zoom lens according to claim 1, wherein an aperture stop is disposed between a surface of the third lens group closest to a reduction conjugate side and a surface of the fifth lens group closest to an enlargement conjugate side.

3. The projection zoom lens according to claim 1, wherein the fourth lens group comprises two negative lenses and one positive lens sequentially from the enlargement conjugate side.

4. The projection zoom lens according to claim 1, wherein the fourth lens group comprises one negative lens and one positive lens sequentially from the enlargement conjugate side.

5. The projection zoom lens according to claim 1, wherein the positive lens, which satisfies Conditional Expressions (1) and (2), satisfies the following Conditional Expression (4):

$$0.85 \leq |\Phi p/\Phi 4| \leq 1.45 \quad (4)$$

where

Φp: refractive power of a positive lens, and
Φ4: refractive power of the fourth lens group.

6. The projection zoom lens according to claim 1, wherein the following Conditional Expression (5) is satisfied:

$$0.18 \leq |\Phi 4/\Phi w| \leq 0.24 \quad (5)$$

where

Φ4: refractive power of the fourth lens group, and
Φw: refractive power of the entire projection zoom lens at the wide-angle end.

7. The projection zoom lens according to claim 1, wherein at least one of the negative lenses included in the fourth lens group satisfies the following Conditional Expressions (6) and (7):

$$0.645 \leq \theta g\_Fn + 0.001682 \times vdn \leq 0.695 \quad (6)$$

$$60 \leq vdn \leq 100 \quad (7)$$

where

θg_Fn: partial dispersion ratio of the lens material,
θg_Fn=(Ng−NF)/(NF−NC)
Ng: refractive index of g line,
NF: refractive index of F line,
NC: refractive index of C line, and
vdn: Abbe number of the lens material.

8. An image projection apparatus comprising: an image forming element configured to form an image light; and the projection zoom lens according to claim 1 configured to enlarge and project the image light.

* * * * *